United States Patent
Picorel et al.

(10) Patent No.: US 12,141,142 B2
(45) Date of Patent: Nov. 12, 2024

(54) SYSTEM AND METHOD FOR ENHANCING PROCESSING OF A QUERY TO A RELATIONAL DATABASE WITH SOFTWARE-BASED NEAR-DATA PROCESSING (NDP) TECHNOLOGY

(71) Applicant: Huawei Technologies Co., Ltd., Shenzhen (CN)

(72) Inventors: Javier Picorel, Munich (DE); Antonio Barbalace, Munich (DE); Antonios Iliopoulos, Munich (DE); Dmitry Voytik, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 372 days.

(21) Appl. No.: 17/154,817

(22) Filed: Jan. 21, 2021

(65) Prior Publication Data
US 2021/0141794 A1 May 13, 2021

Related U.S. Application Data

(63) Continuation of application No. PCT/EP2019/053713, filed on Feb. 14, 2019.

(51) Int. Cl.
*G06F 16/24* (2019.01)
*G06F 9/54* (2006.01)
(Continued)

(52) U.S. Cl.
CPC ........ *G06F 16/24537* (2019.01); *G06F 9/544* (2013.01); *G06F 12/0893* (2013.01); *G06F 16/221* (2019.01); *G06F 2212/608* (2013.01)

(58) Field of Classification Search
CPC .............................................. G06F 16/24537
(Continued)

(56) References Cited

U.S. PATENT DOCUMENTS

| | | | |
|---|---|---|---|
| 7,720,838 B1 * | 5/2010 | Li | G06F 16/24557 707/755 |
| 2012/0017037 A1 * | 1/2012 | Riddle | G06F 16/24569 711/E12.008 |

(Continued)

FOREIGN PATENT DOCUMENTS

| | | |
|---|---|---|
| CN | 107341130 A | 11/2017 |
| CN | 109299133 A | 2/2019 |

(Continued)

OTHER PUBLICATIONS

MySQL 5.6 Reference Manual / Optimization / Optimizing SQL Statements / Optimizing SELECT Statements / Index Condition Pushdown Optimization, total 2 pages (Feb. 5, 2013).

(Continued)

*Primary Examiner* — Syling Yen
(74) *Attorney, Agent, or Firm* — Leydig, Voit & Mayer, Ltd.

(57) ABSTRACT

A system for enhancing processing of a query to a relational database, the system comprising a server associated with a database comprising a plurality of tuples. The server includes processing circuitry for executing a query engine configured to receive a query comprising one or more operators, and optionally, one or more conditions relating to one or more of a plurality of columns constituting each of the plurality of tuples. The server is further configured for propagating the operator(s), and optionally, the condition(s) to a storage engine configured to further propagate the operator(s) and optionally the condition(s) to a memory management module, which is adjusted to process the plurality of tuples retrieved from a storage medium storing the database and return each complying tuple of the plurality of tuples which complies with the operator(s) and optionally (Continued)

the condition(s). The complying tuples received from the storage engine are then output.

20 Claims, 9 Drawing Sheets

(51) Int. Cl.
   *G06F 12/0893* (2016.01)
   *G06F 16/22* (2019.01)
   *G06F 16/2453* (2019.01)
(58) Field of Classification Search
   USPC .......................................................... 707/706
   See application file for complete search history.

(56) References Cited

U.S. PATENT DOCUMENTS

| | | | |
|---|---|---|---|
| 2013/0110862 | A1 | 5/2013 | Chen et al. |
| 2013/0318068 | A1 | 11/2013 | Apte et al. |
| 2015/0081658 | A1 | 3/2015 | Meyles et al. |
| 2016/0239582 | A1 | 8/2016 | Schechter et al. |
| 2016/0267132 | A1 | 9/2016 | Castellanos et al. |
| 2016/0350371 | A1 | 12/2016 | Das et al. |
| 2017/0177269 | A1* | 6/2017 | Beard ................... G06F 3/0683 |
| 2017/0293658 | A1* | 10/2017 | Zhang ............... G06F 16/24554 |
| 2018/0218039 | A1* | 8/2018 | Steinbeck .......... G06F 16/24542 |
| 2019/0354521 | A1* | 11/2019 | Tian ..................... G06F 16/2455 |
| 2021/0019319 | A1* | 1/2021 | Vogelsgesang ... G06F 16/24542 |

FOREIGN PATENT DOCUMENTS

| | | |
|---|---|---|
| JP | H02230373 A | 9/1990 |
| JP | 2015072681 A | 4/2015 |
| KR | 20150032508 A | 3/2015 |
| KR | 20170118116 A | 10/2017 |
| WO | 2013177313 A2 | 11/2013 |

OTHER PUBLICATIONS

Keeton et al.,"A Case for Intelligent Disks (IDISKs)," SIGMOD Record, vol. 27, No. 3, total 11 pages (Sep. 1998).
Vijaykumar et al.,"A Case for Richer Cross-layer Abstractions: Bridging the Semantic Gap with Expressive Memory," 2018 ACM/IEEE 45th Annual International Symposium on Computer Architecture, total 14 pages (2018).
Ahn et al.,"A Scalable Processing-in-Memory Accelerator for Parallel Graph Processing," 2015 ACM/IEEE 42nd Annual International Symposium on Computer Architecture (ISCA), total 13 pages (Jun. 2015).
Oracle, "A Technical Overview of the Oracle Exadata Database Machine and Exadata Storage Server," An Oracle White Paper, total 43 pages (Dec. 2013).
Lee et al.,"Accelerating External Sorting via On-the-fly Data Merge in Active SSDs," HotStorage'14, Proceedings of the 6th USENIX conference on Hot Topics in Storage and File Systems, total 5 pages (Jun. 2014).
Cho et al.,"Active Disk Meets Flash: A Case for Intelligent SSDs," ICS'13, Eugene, Oregon, USA, total 12 pages (Jun. 10-14, 2013).
Tiwari et al.,"Active Flash: Towards Energy-Efficient, In-Situ Data Analytics on Extreme-Scale Machines," 11th USENIX Conference on File and Storage Technologies (FAST'13), total 14 pages, USENIX Association (2013).
Riedel et al.,"Active Storage For Large-Scale Data Mining and Multimedia," Proceedings of the 24th VLDB Conference, New York, USA, total 12 pages (1998).
Neumann, "Efficiently Compiling Efficient Query Plans for Modern Hardware," The 37th International Conference on Very Large Data Bases, Proceedings of the VLDB Endowment, vol. 4, No. 9, Seattle, Washington, total 12 pages, (Aug. 29-Sep. 3, 2011).
Gao et al.,"HRL: Efficient and Flexible Reconfigurable Logic for Near-Data Processing," 2016 IEEE International Symposium on High Performance Computer Architecture (HPCA), total 12 pages (Apr. 2016).
Woods et al.,"Ibex—An Intelligent Storage Engine with Support for Advanced SQL Off-loading," the 40th International Conference on Very Large Data Bases, Proceedings of the VLDB Endowment, vol. 7, No. 11, Hangzhou, China, total 12 pages (Sep. 1-5, 2014).
Francisco et al., "IBM PureData System for Analytics Architecture A Platform for High Performance Data Warehousing and Analytics," total 16 pages (2014).
Boncz et al.,"MonetDB/X100: Hyper-Pipelining Query Execution," Proceedings of the 2005 CIDR Conference, total 13 pages (2005).
Pugsley et al.,"NDC: Analyzing the Impact of 3D-Stacked Memory+Logic Devices on MapReduce Workloads," 2014 EEE International Symposium on Performance Analysis of Systems and Software (ISPASS), total 11 pages (2014).
Balasubramonian et al.,"Near-Data Processing: Insights from a MICRO-46 Workshop," IEEE Micro, vol. 34, Issue: 4, total 7 pages (Jul.-Aug. 2014).
Do et al.,"Query Processing on Smart SSDs: Opportunities and Challenges," SIGMOD'13, New York, New York, USA, total 10 pages (Jun. 22-27, 2013).
Drumond et al.,"The Mondrian Data Engine," ISCA'17, Toronto, ON, Canada, 2017 Association for Computing Machinery, total 13 pages (Jun. 24-28, 2017).
Jo et al.,"YourSQL: A High-Performance Database System Leveraging In-Storage Computing," Proceedings of the VLDB Endowment, vol. 9, No. 12, Copyright 2016 VLDB Endowment, total 12 pages (2016).

* cited by examiner

SYSTEM AND METHOD FOR ENHANCING PROCESSING OF A QUERY TO A RELATIONAL DATABASE WITH SOFTWARE-BASED NEAR-DATA PROCESSING (NDP) TECHNOLOGY

CROSS-REFERENCE TO RELATED APPLICATIONS

This application is a continuation of International Patent Application No. PCT/EP2019/053713, filed on Feb. 14, 2019, the disclosure of which is hereby incorporated by reference in its entirety.

TECHNICAL FIELD

The present disclosure relates to a system and a method for enhancing processing of a query to a relational database with software-based near-data processing technology.

BACKGROUND

Since the start of the information era (digital era) and digital information has become a fundamental foundation for almost any type of industry and market segment, the volumes of digital information are constantly increasing in explosive growth rates with data volumes doubling every 12 to 18 months.

Databases in general and relational databases managed by Relational Databases Management Systems (RDBMS) in particular provide structured semantics to derive information from large datasets. The RDBMSes, for example, Oracle Database, Microsoft SQL Server, SAP HANA, IBM Db2, MySQL, PostgreSQL, and/or the like have therefore become a ubiquitous basic building block applied in numerous industries and applications ranging from government information management infrastructures, financial platforms and business intelligence through industry management systems to mobile applications.

The RDBMS structures data according to the relational model in which data is organized in tables each containing a number of records or tuples. Each tuple is subsequently composed of a variable number of attributes (or columns). Queries directed to retrieve data from the RDBMS are written in a high-level declarative query language, for example, Structured Query Language (SQL), and/or the like, which are subsequently converted into one or more relational operators that are submitted to the relational database managed by the RDBMS.

The RDBMS is typically designed and constructed based on a modular programming paradigm such that the RDBMS which may be significantly complex typically consists of several well differentiated and independent modules for processing DB data according to operators and optionally conditions extracted from queries directed to the DB. Moreover, the RDBMS typically utilize storage medium access services provided by memory management modules which may be inherent to an Operating System (OS) or deployed as an add-on module. Due to the highly hierarchical and modular structure of the RDBMS, database (DB) data retrieved from the storage medium may traverse many of the software modules to reach the modules where the DB data is processed. Since typically only a significantly small fraction of the DB tuples may comply with a query submitted to the RDBMS, most data traversing the hierarchical structure is irrelevant.

SUMMARY

An objective of the embodiments of the disclosure is to provide a solution which mitigates or solves the drawbacks and problems of conventional solutions.

The disclosure aims at providing a solution for improving the performance of the RDBMS by significantly reducing volume of DB data traversing through the RDBMS hierarchical structure between the software modules managing the storage medium storing at least one part of the DB and the software modules processing the DB data according to queries directed to the RDBMS.

According to a first aspect, there is provided a system for enhancing processing of a query to a relational database, comprising at least one processing circuitry of a server associated with a database comprising a plurality of tuples, the at least one processing circuitry(s) is configured for:

Executing a query engine configured to receive a query comprising one or more operators and optionally one or more conditions relating to one or more of a plurality of columns constituting each of the plurality of tuples.

Propagating the operator(s) and optionally the condition(s) to a storage engine configured to further propagate the operator(s) and optionally the condition(s) to a memory management module adjusted/configured to process the plurality of tuples retrieved from a storage medium storing at least one part of the database and return each complying tuple of the plurality of tuples which complies with the operator(s) and optionally with the condition(s).

Outputting each of the complying tuples received from the storage engine.

According to a second aspect, there is provided a computer implemented method of enhancing processing of a query to a relational database, comprising using at least one processing circuitry of a server associated with a database comprising a plurality of tuples, the processing circuitry(s) is configured for:

Executing a query engine configured to receive a query comprising one or more operators and optionally one or more conditions relating to one or more of a plurality of columns constituting each of the plurality of tuples.

Propagating the operator(s) and optionally the condition(s) to a storage engine configured to further propagate the operator(s) and optionally the condition(s) to a memory management module adjusted/configured to process the plurality of tuples retrieved from a storage medium storing at least one part of the database and return each complying tuple of the plurality of tuples which complies with the operator(s) and optionally with the condition(s).

Outputting each of the complying tuples received from the storage engine.

The database may be stored in a storage medium or a plurality of storage mediums. In the latter alternative, a storage medium may store at least one part of the database.

According to a third aspect, there is provided a computer program with a program code for performing a method of enhancing processing of a query to a relational database according to the second aspect.

According to a fourth aspect, there is provided a computer readable storage medium comprising computer program code instructions, being executable by a computer, for performing a method of enhancing processing of a query to a relational database according to the second aspect.

Processing the tuples at the memory management modules which are typically used to retrieve data from the storage medium and returning only complying tuples to the query engine enables transferring only complying tuples that comply with the operator(s) and optionally with the condition(s) from a storage manager to the query engine as opposed to transferring all tuples as may be done by existing RDBMS implementations. This may significantly reduce and potentially prevent data transfer bottlenecks between the RDBMS layers and may thus significantly reduce query response latency. Moreover, the solution is a software solution requiring no additional complex, costly and typically custom hardware elements as may be done by some of the existing RDBMS implementations. Being a software solution, it may be easily integrated, ported and/or adopted in many RDBMSs deployed for a plurality of applications, systems, platforms and services.

In an optional implementation form of the first and/or second aspects, the query engine is configured to apply one or more other operators included in the query to one or more of the complying tuples received from the storage engine to identify and output each complying tuple which complies with the other operator(s). Splitting processing of the tuples between the query engine and the storage engine may support high flexibility in data processing utilization in different layers of the RDBMS and OS as well as in trading off between processing utilization and volume of propagated data. For example, operator(s) and condition(s) which may yield major reduction in the amount of complying tuples may be propagated down and processed by the storage manager. The storage manager may return to the query engine these complying tuples which may constitute a significantly small fraction of the overall amount of tuples. The query engine may then further process the complying tuples according to other operator(s) and optionally other condition(s) defined by the query which are not propagated down. This may allow for minimal alteration, adjustment and/or redesign of the storage manager as well as to the programming interfaces between the RDBMS and the OS which may reduce the effort in adopting the proposed solution. This may also significantly reduce the amount of tuples (data volume) transferred from the storage manager to the query engine while the volume of data propagated down (i.e. the operator(s) and condition(s)) from the query engine to the storage manager is also kept to a minimum.

In a further implementation form of the first and/or second aspects, the operator(s) and optionally the condition(s) are propagated to the storage engine using an extended query semantics Application Programming Interface (API) defined to support transfer of query semantics of a query language used by the query from the query engine to the storage engine. Extending the API between the query engine and the storage engine modules of the RDBMS may be essential for facilitating the propagation of the query semantics, i.e. the operator(s) and the optional condition(s) defined in the query between the RDBMS modules, specifically the query engine and the storage engine.

In a further implementation form of the first and/or second aspects, the storage engine uses an extended OS API defined to support propagation of the operator(s) and optionally the condition(s) to an adjusted storage manager inherent to an OS executed by the processing circuitry(s). The storage manager is configured to store data retrieved from the storage medium in an allocated buffer and propagate the operator(s) and optionally the condition(s) to the memory management module. Just as an example, the memory management module may be inherent to an OS. Extending the API between the RDBMS, specifically between the storage engine which is a low level module of the RDBMS and the OS may be essential for propagating down the query semantics, i.e. the operator(s) and the optional condition(s) defined in the query. Moreover, the memory management module inherent to the OS may present high performance in data retrieval from the storage medium and using it for processing the tuples may therefore present significantly high tuples processing performance.

In a further implementation form of the first and/or second aspects, the adjusted memory management module comprises an adjusted page cache management module of the OS, the adjusted page cache management module extends functionality of a legacy page cache management module configured to load pages of data stored in the storage medium to a page cache of the OS to further process one or more of the plurality of tuples stored in one or more page loaded to the page cache to identify one or more of the complying tuples. Page cache is one of the most common and wide spread implementation for storage management and is employed by many OSs. Therefore adjusting the page cache management module may encourage and increase adoption and integration of the enhanced RDBMS structure in many RDBMSs deployed for a plurality of applications, systems, platforms and services.

In a further implementation form of the first and/or second aspects, the adjusted page cache management module is dynamically loaded to replace a legacy page cache management module. Dynamically loading the adjusted software modules supporting the query semantics propagation and the tuples processing for the storage manager and the memory management modules may allow for easily loading the adjusted software modules without the need to redeploy the entire RDBMS and/or OS. This may further simplify adoption and integration of the enhanced RDBMS structure in existing RDBMSs.

In a further implementation form of the first and/or second aspects, the adjusted memory management module comprises an adjusted buffer pool management module configured to load pages of data stored in the storage medium to a buffer pool, the adjusted buffer pool management module is further configured to receive the operator(s) and optionally the condition(s) and process one or more of the plurality of tuples stored in one or more page loaded to the buffer pool to identify one or more of the complying tuples. Buffer pool is another common and wide spread implementation for storage management and may be employed by many RDBMSs. Therefore adjusting the page cache management module may encourage and increase adoption and integration of the enhanced RDBMS structure in many RDBMSs deployed for a plurality of applications, systems, platforms and services.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Figure 1:
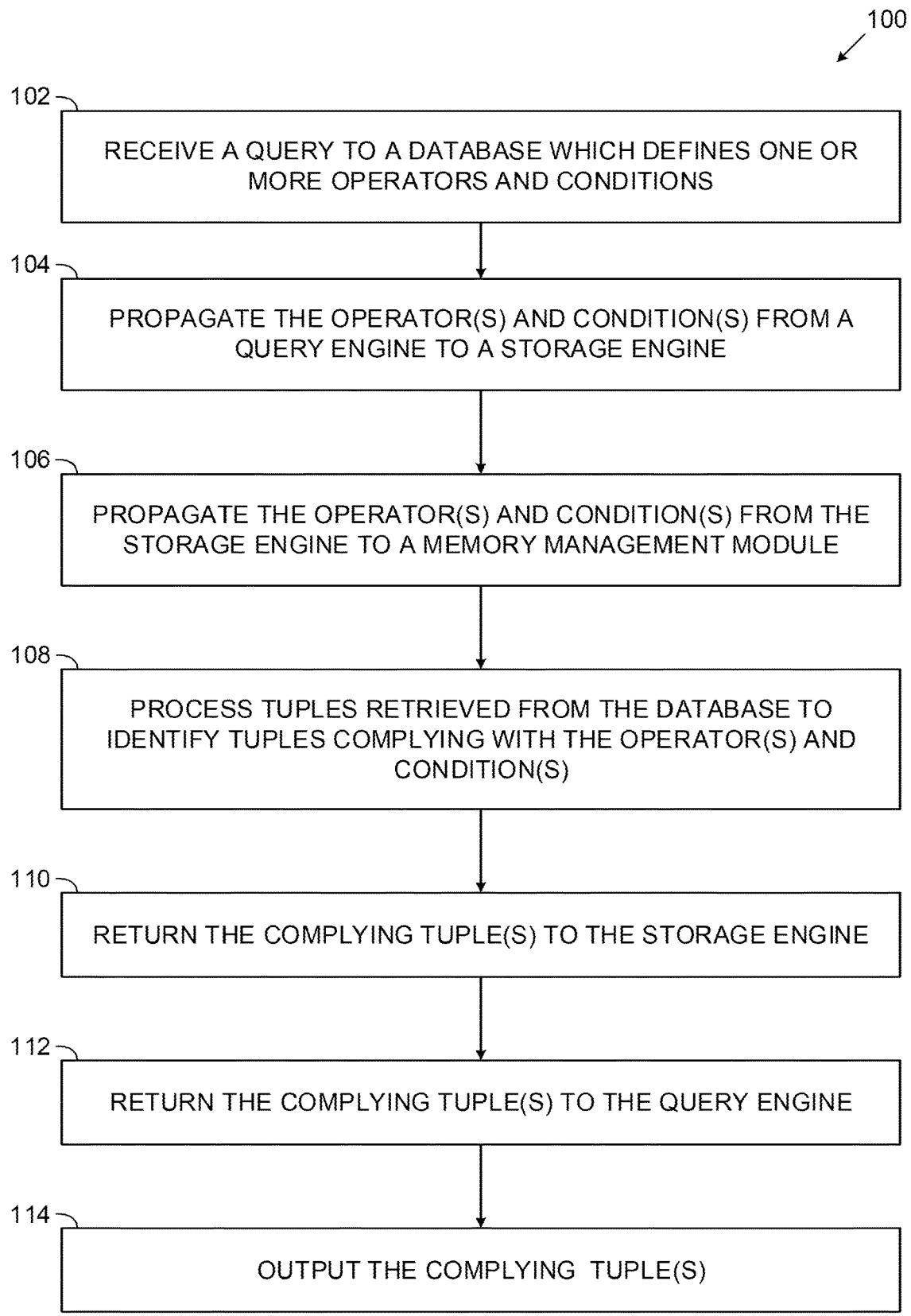
FIG. 1 is a flowchart of an exemplary process of processing a query to a relational database by propagating the query operator(s) and optional condition(s) to an adjusted memory management module configured to process tuples of the database retrieved from a storage medium, according to some embodiments.

The present disclosure, in some embodiments, relates to enhancing processing of a query to a relational database and, more specifically, but not exclusively, to enhancing processing of a query to a relational database by propagating the query operators and conditions to adjusted memory management modules configured to process tuples retrieved from a storage medium storing at least one part of the relational database.

The architecture of RDBMSes applied to manage a relational database stored in a storage medium of a computing node, for example, a server, a node, a cluster of nodes and/or the like is typically designed and constructed according to prevalent best and proven programming practices of module programming. It is also applicable for the relational database stored in a plurality of storage mediums (that is, the relational database is stored in the plurality of storage mediums in a distributed way). The plurality of storage mediums may be deployed in a computing node or a plurality of computing nodes.

The modular programming which is based on separating the functionality of the overall program to independent and interchangeable software modules each specialized to perform a subset of the overall functionality may provide many benefits such as, for example, code reusability, ease of software design, and simplified code maintenance among others. These software modules expose their functionality through an abstract Application Programming Interface (API) which may be used to communicate and transfer data between the independent software modules.

Following the modular programming paradigm, the RDBMS, which may be significantly complex typically consists of four well differentiated and independent modules; a request manager, a parser, a query engine, and a storage engine. The request manager receives the query requests, for example, SQL queries, and may allocate and schedule resources for executing the queries. Then, the parser uses regular expressions to parse and analyze the SQL query. The query engine generates a query plan composed of an Abstract Syntax Tree (AST) of relational operators and tables. The storage engine manages the tables and tuples.

Among the RDBMS software modules, the query engine and the storage engine are the most important modules since most of the execution time of the RDBMS is spent in these two modules.

The query engine specializes in processing the data (i.e., tuples retrieved from the database stored in the storage medium), while the storage engine specializes in data access roles (i.e., accessing the storage medium to retrieve and/or commit tuples in the database). The API between legacy query and storage engines (i.e., open, next, close) is typically completely abstract with no processing semantics exposed or passed (transferred) from the query to the storage engine. Hence, each of the relational operators is processed using the same exact interface.

The RDBMS typically executes in an environment with one Operating System (OS), for example, Linux, Windows, macOS, and/or the like typically supporting a Portable Operating System Interface (POSIX) or similar API to provide further abstraction of the hardware computing platform to the RDBMS. Since the database itself, i.e. the data and the information relating to the tables is generally stored in form of files on one or more file systems mounted on the storage medium, the data stored in the storage medium is accessed using services, functions and/or features provided by the OS or supplemental services added to the OS, for example, a storage manager, in particular a storage manager such as, for example, a file system, a Virtual file System (VFS) and/or the like.

Due to the traditionally slow access of storage mediums, legacy software systems traditionally integrate software caches for storing data chunks of the aforesaid storage medium, for example, pages, segments, and/or the like into high speed memory, for example, volatile memory (e.g. Random Access Memory), a processor integrated cache and/or the like for faster processing of the data. The RDBMS may integrate such functionality in the storage engine, by implementing its own software cache, for example, a buffer pool and/or the like as known in the art. Additionally and/or alternatively, the RDBMS may utilize software cache mechanisms integrated (inherent) in the OS, for example, a page cache and/or the like as known in the art. The page cache and the buffer pool are implemented using respective memory management software modules, specifically a page cache management module and a buffer pool management module respectively.

Therefore, in order to retrieve the tuples from the database stored in the storage medium, the storage engine utilizes either function calls to interact with the memory management modules, specifically the buffer pool management module, or system calls of the OS to interact with the storage manager (VFS or the like), which in turn may employ the page cache management module for accessing the storage medium.

Similarly to the API between the query engine and the storage engine, the API between the storage engine and the OS (i.e., open, read/write, and close) is also abstract and hence carries no information or semantics of the upper layers of the software stack, specifically the query semantics but rather carries only information relating to the data access to the database stored in the storage medium. In the same way, the API between the storage engine and its buffer pool management module is abstract and similarly carries only information related to accessing data.

The implication of the modular implementation in which the RDBMS modules are specialized for their designated functionalities coupled with the abstract API is that every tuple of the database must traverse all the way up from where the data resides (i.e., page cache or buffer pool) through the entire storage engine to the query engine regardless of whether the tuple is useful for the final computation, i.e. complies with the operator(s) and optional condition(s) defined by the query. This data flow results from the fact the in legacy RDBMSes the query engine is the functional module which processes the tuples while all the other modules are applied to merely retrieve the data from the database and transfer it to the query engine and are hence agnostic to the query semantics, i.e. the operator(s) and their optional condition(s).

According to some embodiments, there are provided methods, systems and computer program products for enhancing processing of queries to the relational database by propagating the query semantics, i.e., the operator(s) and optionally the condition(s) (if exist) to adjusted software modules, specifically adjusted memory management modules configured to process tuples of the database retrieved from the storage medium. This implementation may be designated by the term Near Data Processing (NDP), a term which reflects the fact that the data is processed by the memory management modules at the point of data retrieval from the storage medium rather than the data traversing all the functional modules up to the query engine as done in current RDBMS architectures.

To this goal, the query engine and the storage engine may be adjusted to support an extended query semantics API which is defined to support the query engine to propagate the query semantics to the storage engine.

Moreover, the OS API exposing the functionality of the storage manager (for example, the VFS or the like) may be also extended to support propagating down the query semantics from the storage engine to a memory management module, for example, the page cache management module. The page cache management module is further adjusted to process the tuples retrieved from the database according to the received (propagated) query semantics. In case of the buffer pool utilized by the storage engine, the buffer pool management module may be adjusted to process the tuples retrieved from the database according to the received (propagated) query semantics. In both of the aforesaid cases, the page cache management module and/or the buffer pool management module may be adjusted and/or replaced to support the processing of the tuples immediately after retrieved from the database stored in the storage medium and loaded into the high speed memory serving as the software cache.

The legacy APIs enable the lower level software modules, for example, the storage engine, the storage manager, the page cache management module and the buffer pool management module to move data up towards the query engine. To this effect one or more of these APIs may be extended and/or adjusted to support transfer of only complying tuples compliant with the propagated down query semantics rather than transferring all tuples.

The page cache and/or the buffer pool may be adjusted and/or replaced statically upfront prior to runtime and/or at runtime using any available technique, features and/or services, such as, for example, dynamic loading of modules which may be supported by the OS and/or by the RDBMS, virtual-machine approaches, such as eBPF and/or the like.

The near-data processing (NDP) implementation for the RDBMS may present major advantages and benefits compared to the exiting RDBMSs architectures.

First, by relegating at least part of the query processing to the memory management modules adjusted to process the tuples memory management module and return only the complying tuples to the query engine the need to transfer all the database tuples to the query engine may be avoided. Transferring all the database tuples to the query engine, a process accomplished by having the tuples traversing the large and complex software stacks of the storage and query engines, as may be done by the currently existing RDBMSes may present a major bottleneck thus inflicting significant query response latency and/or processing time penalty. In contrast, in the NDP-capable RDBMS, only the complying tuples, which comply with the pushed (propagated) down operator(s) optionally with respective condition(s) and are hence usually very limited in volume, traverse back to the query engine thus significantly reducing the query latency and/or the processing time.

For example, assuming an SQL query submitted to the RDBMS inquires for the first name and last name information of people from China. In the legacy RDBMS, all the tuples from a "tablePeople" table in the database regardless of whether the tuples satisfy (comply with) the condition of "China" are transferred to the query engine, which may process the tuples to identify and respond to the query with the tuples complying with the "China" condition. In the NDP-capable RDBMS on the other hand, the modules where data resides, receive the propagated query semantics, specifically the operator select and the condition "China" may identify the tuples complying with the "China" condition and may therefore transfer back to the query engine only the complying tuples. The same may apply for the other operators, for example, project, aggregate, join and/or the like.

Moreover, some of the existing RDBMSes may apply specialized additional hardware to support pushing down (propagating) the query semantics in attempt to reduce the volume of the data traversed through the software modules layers of the RDBMS and the OS. For example, Oracle Exadata Database Machine may use one or more additional computing nodes (servers) to deploy a separate storage layer, known as the Exadata Storage servers, in addition to the database computing nodes (servers), known as the Exadata Database servers. The added storage server stores the databases. The storage server may be configured to push down a limited set of the query semantics, specifically only the select operator semantics to the separate storage layer (i.e., the Exadata Storage servers). In another example, the Ibex and IBM PureData RDBMSes may use a dedicated specialized Field Programmable Gate Array (FPGA) between the storage medium and the computing node running the RDBMS in order to push down the query semantics to the FPGA which may locally process the tuples retrieved from the storage medium. In another example, the YourSQL employs a processing-capable Solid State Disk (SSD) along with a programmable hardware accelerator for the process the tuples retrieved from the SSD according to the pushed down query semantics.

The hardware approaches such as those described herein may present several disadvantages. First, additional and typically costly hardware is required thus significantly increasing the cost of the RDBMS. Second, the design and deployment of the additional hardware may be significantly complex and may require significant customization to be deployed for different RDBMSs and/or different applications. Third, as performance of processing platforms continuously and significantly increases, the dedicated specialized hardware may become obsolete and/or significantly low in performance with respect to general-purpose platforms within a relatively short period of time due to technology scaling. In addition, while the hardware approaches may improve performance in terms of query response latency for data present in the storage medium, these hardware solutions still require major volumes of data to traverse between the various software modules, since the relational operators are not pushed to the data present in the transitory memory (e.g. volatile memory, temporary buffers, etc.) of the RDBMS servers, thus incurring a significant processing overheads. It should be noted that due to the principle of locality, it is generally expected in the common case to find the data in the software caches of the RDBMS or OS.

In contrast, the NDP-capable RDBMS is a software only solution requiring no additional hardware resources and/or processing nodes and is therefore significantly cheaper to deploy. Moreover, the NDP-capable RDBMS may be highly scalable as it may be deployed as an inherent software solution in the database regardless of its size. Furthermore, the NDP-capable RDBMS is applicable to data present in the storage medium as well as to data present in the transitory memory and is hence applicable to all the data accesses regardless of the data current location.

In addition, as the NDP-capable RDBMS is a software only solution, the NDP-capable RDBMS may be easily integrated and adopted in a wide range of existing RDBMS platforms and systems while providing high flexibility and requiring significantly modest efforts.

While there are some existing RDBMS implementations, for example, MySQL which are software only solutions for optimizing performance by pushing down the query semantics and moving only complying tuples through the software model layers, these solutions are highly limited even if somewhat improving query processing performance. First, such implantations are limited to pushing down only the "select" operator while unable to push down other operators. Moreover, these implementations use an auxiliary index data structure for mapping the pushed down semantics. The indexing mechanism may present major limitations. First, the indexes may not always be available for the push down and when available, the indexes are very inefficient as their dataset size scales with the size of the table accessed in the database. In worst case scenarios, the size of the index may double the size of the database. In addition, the indexes are dynamic data structures (e.g., hash tables, skip lists, etc.) which are pointer based, making their access extremely inefficient in modern Central Processing Unit (CPU) architectures. Also, useless tuples may still traverse significant portions of the software stack of the storage engine as these techniques do not directly operate in the buffer pool or page cache memory management modules. Hence these RDBMS implementations fail to reduce the data movement and its associated processing overhead for the useless tuples.

The NDP-capable RDBMS on the other hand does not require employing such indexing mechanisms and structures but rather extends the APIs to directly propagate the query semantics to the memory management modules in an efficient manner which may inflict only an insignificant and typically negligible addition of data that is transferred to the memory management modules. The volume of data that is returned from the memory management modules to the query engine on the other hand is dramatically reduced thus significantly reducing data movement between the RDBMS software layers and significantly improving processing and/or query response time performance.

Before explaining at least one embodiment in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

Aspects are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of processing a query to a relational database by propagating the query operator(s) and optional condition(s) to an adjusted memory management module configured to process tuples of the database retrieved from a storage medium, according to some embodiments.

An exemplary process 100 may be executed by one or more computing nodes associated with a relational database. Specifically, the computing node(s) are adapted to receive input queries and respond with tuples retrieved from the relational database which comply with one or more relational operators and optionally one or more conditions defined and/or represented by the input queries. The process 100 may be applied to enhance processing of queries submitted to the relational database by using adjusted legacy lower level software modules typically configured to retrieve data from a storage medium storing the database. The lower level software modules may be adjusted to further process tuples retrieved from the database, identify tuple(s) complying with the operator(s) and optionally with the condition(s) defined by the query and return the complying tuples.

This is done by propagating (pushing) down query semantics, i.e., one or more of the operator(s) and optionally the condition(s) defined by the query, from the higher level software modules to the lower level software modules, typically memory management modules which may be part of an OS executed (hosted) by the computing node(s) and/or an RDBMS executed by the computing node(s) to manage the database.

To this end, an enhanced software infrastructure, specifically an extended API may be deployed to enable and support the down propagation of the query semantics to the lower level software modules which are adjusted to process tuples retrieved from the storage medium. Complementary, the extended API may support the lower level software modules in propagating back (up) complying tuples in response to the query.

Figure 2:
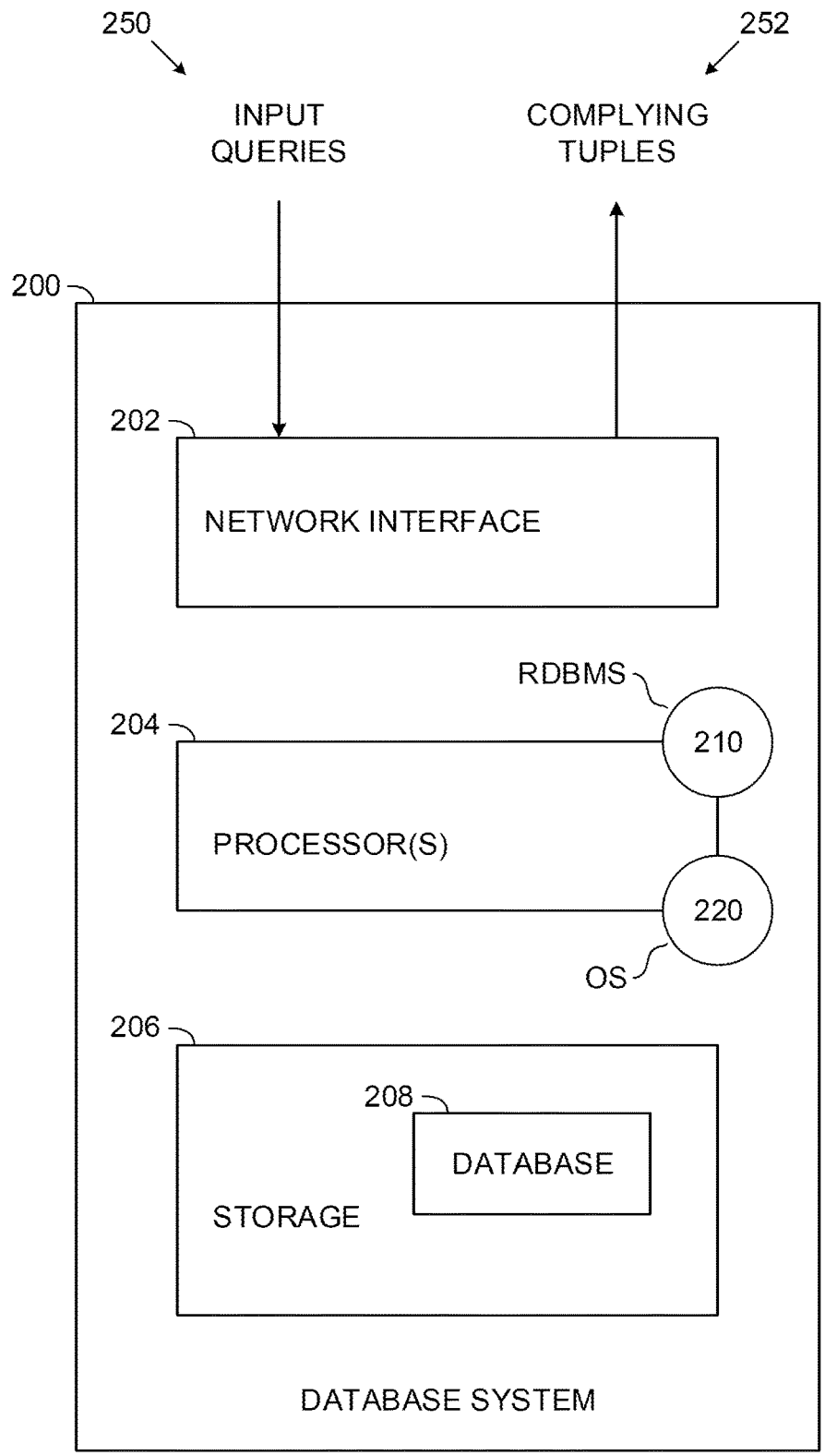
FIG. 2 is a schematic illustration of an exemplary system for processing a query to a relational database by propagating the query operator(s) and optional condition(s) to an adjusted memory management module configured to process tuples of the database retrieved from a storage medium, according to some embodiments.

Reference is also made to FIG. 2, which is a schematic illustration of an exemplary system for processing a query to a relational database by propagating query operator(s) and optionally the condition(s) to an adjusted memory management module configured to process tuples of the database retrieved from a storage medium, according to some embodiments.

An exemplary database system 200, for example, a computer, a server, a computing node, a cluster of computing nodes and/or the like associated with a relational database 208 may execute a process such as the process 100 for enhancing processing of queries submitted for the database 208. The database system 200 may include a network interface 202, a processor(s) 204 for executing the process 100 and storage 206 for storing code and/or data and typically for storing the database 208. In particular, the database 208 may be an SQL database, for example, Oracle, MySQL, Microsoft SQL Server, PostgreSQL and/or the like.

The network interface 202 may include one or more network interfaces for connecting to one or more wired and/or wireless networks, for example, a Local Area Network (LAN), a Wide Area Network (WAN), a Municipal Area Network (MAN), a cellular network, the internet and/or the like for to facilitate communication with one or more network nodes accessing the database 208. Through the network interface 202, the database system 200 may receive one or more queries 250 submitted by other node(s) in the network to the database 208 and respond with the complying tuples 252 retrieved from the database 208 after identified to comply with operator(s) and optionally with the condition(s) defined by the respective queries.

The processor(s) 204, homogenous or heterogeneous, may include one or more processing nodes arranged for parallel processing, as clusters and/or as one or more multi-core processor(s).

The storage 206 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 206 may further comprise one or more network storage resources, for example, a storage server, a Network Attached Storage (NAS), a network drive, and/or the like accessible via one or more networks through the network interface 202.

The processor(s) 204 may execute one or more software modules, for example, a process, a script, an application, an agent, a utility, a tool, an OS and/or the like each comprising a plurality of program instructions stored in a non-transitory medium such as the storage 206 and executed by one or more processors such as the processor(s) 204. For example, the processor(s) 204 may execute a Relational Database Management System (RDBMS) 210 for managing the database 208. The RDBMS 210 is typically executed in conjunction with an OS 220, for example, Linux, Windows, and/or the like which facilitates and provides access services for the RDBMS 210 to the storage medium, specifically the storage 206 storing the database 208.

In some deployments the database system 200 is utilized by a single computing node hosting both the RDBMS 210 and the database 208. In such case, the database system 200 may execute both the RDBMS 210 and the OS 220 providing access to the database 208. However, in some deployments, the database system 200 may be distributed between multiple computing nodes such that the RDBMS 210 may be executed by a first computing node and the database 208 may be hosted by a second computing node. In such deployments, the first computing node may execute the RDBMS 210 (typically in an OS environment) while the second computing node executes the OS 220 providing the access services to the database 208. The first and second computing nodes may communicate with each other to facilitate communication between the RDBMS 210 and the OS 220.

Optionally, the database system 200 and/or the RDBMS 210 are provided by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure, Alibaba Cloud, Huawei Cloud, and/or the like.

Figure 3A:
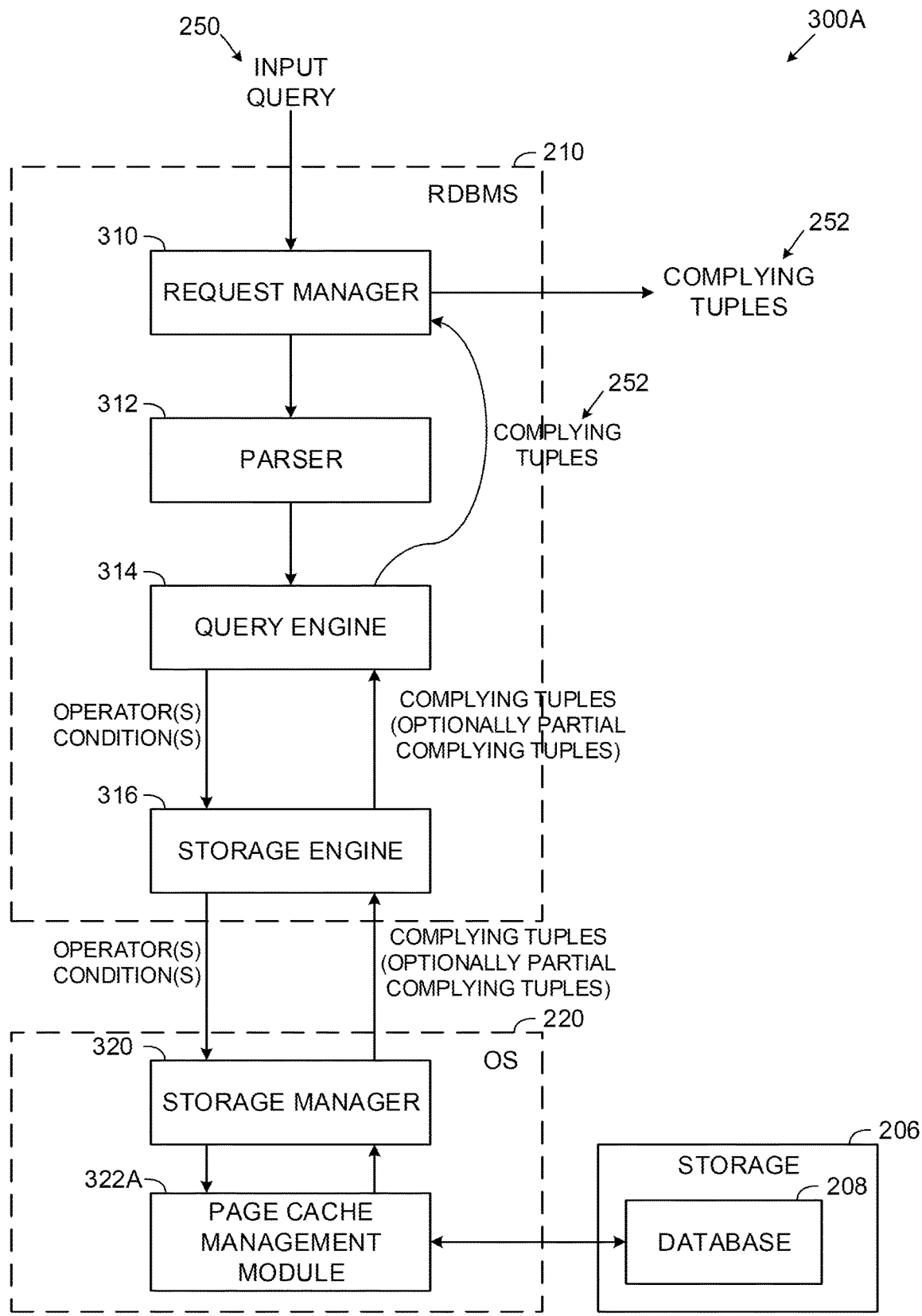
FIG. 3A and FIG. 3B are schematic illustrations of exemplary software models for processing a query to a relational database by propagating the query operator(s) and optional condition(s) to an adjusted memory management module configured to process tuples of the database retrieved from a storage medium, according to some embodiments.
Figure 3B:
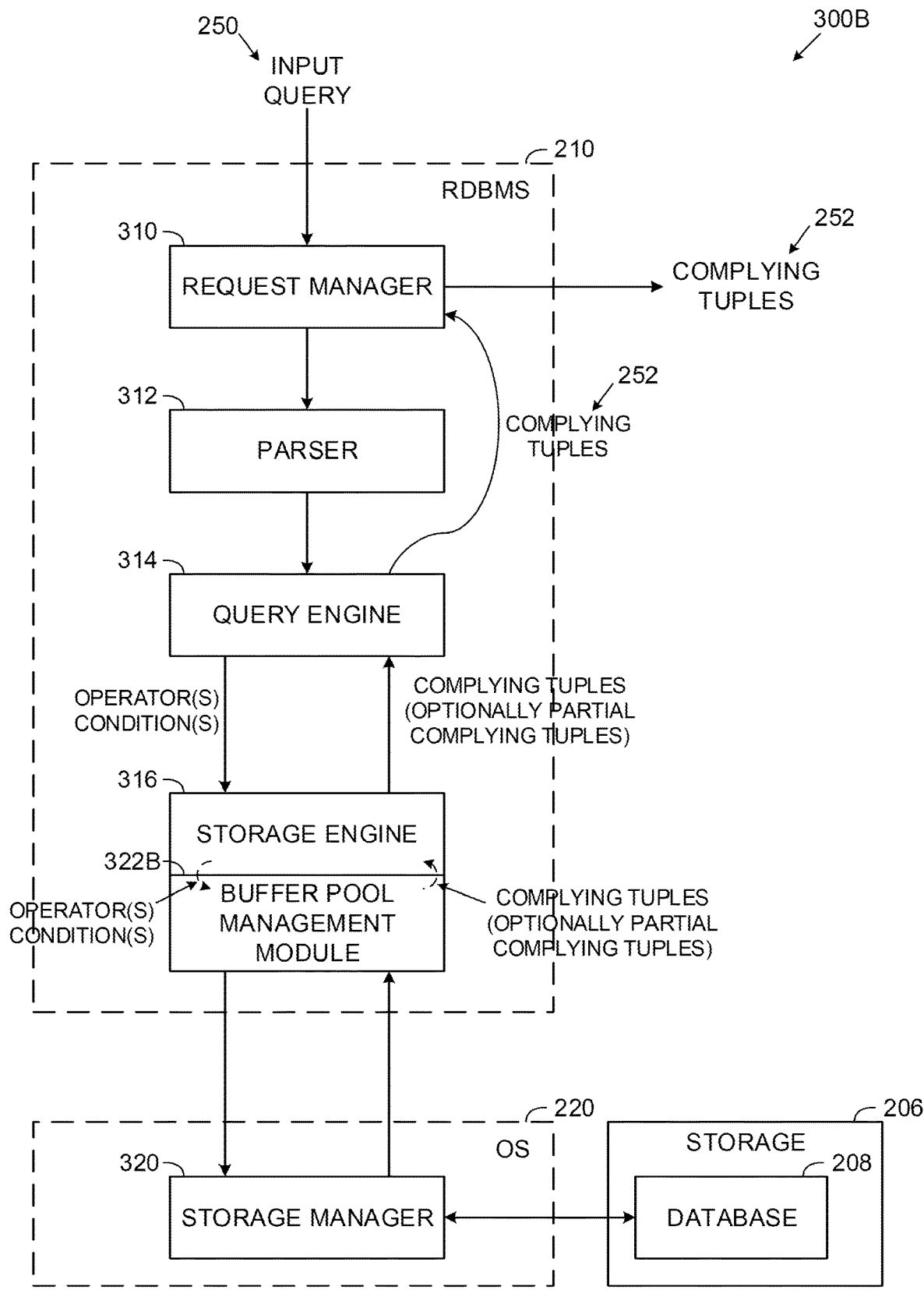

Reference is now made to FIG. 3A and FIG. 3B, which are schematic illustrations of exemplary software models for processing a query to a relational database by propagating the query operator(s) and optionally the condition(s) to an adjusted memory management module configured to process tuples of the database retrieved from a storage medium, according to some embodiments.

Exemplary software models 300A and 300B are layered models in which an RDBMS such as the RDBMS 210 deployed to manage a database such as the database 208 is constructed of one or more software modules, for example, a request manager 310, a parser 312, a query engine 314 and a storage engine 316. The request manager 310 may be configured to receive a query such as the queries 250 directed to the database 208. The query 250 may be constructed using query language, for example, SQL, and/or the like as known in the art. The parser 312 may be configured to use regular expressions to parse (analyze) the query 250 and identify the elements of the query as known in the art. The query engine 314 may be configured to extract one or more operators and one or more conditions (if exist) expressed by the query elements. The query engine 314 may further generate a query plan composed of an AST of the extracted relational operators and tables as known in the art. The storage engine 316 may be configured to retrieve tuples from the database 208 as known in the art.

As seen in the models 300A and 300B, the query engine 314 may be further configured and/or adjusted to transfer (propagate down) the query semantics, specifically the operator(s) and optionally the condition(s), to the storage engine 316 and receive in response tuples which comply with the respective operator(s) and optional condition(s).

The RDBMS 210 may typically be executed in the environment of an OS such as the OS 220. The RDBMS 210, in particular the storage engine 316 may therefore utilize storage and/or memory access management modules and/or services provided by the OS 220 for accessing the database 208 stored in the storage medium 206 as seen in the models 300A and 300B.

In particular, the OS 220 may comprise, among other software modules, a storage manager 320, for example, a file system mounted on the storage 206, a virtual File System (VFS) which provides an abstraction layer over one or more file systems and/or the like which may be used to access the storage 206 for read and/or write operations from/to the storage 206.

As seen in the model 300A, the storage engine 316 utilizes an adjusted memory management module 322, specifically a page cache management module 322A configured to load data, specifically tuples of the database 208 from the storage 206 to a high speed memory, for example, RAM, cache and/or the like in which the tuples may be processed.

In implementations as presented in model 300A, the storage engine 316 may be further configured and/or adjusted to transfer (propagate) the query semantics, specifically the operator(s) and optionally the condition(s), to the storage manager 320 and receive in response tuples which comply with the respective operator(s) and optional condition(s). Moreover, the storage manager 320 may be adjusted to further propagate the query semantics to the adjusted memory management module 322 of the OS 220, for example, the page cache management module 322A adapted to process tuples retrieved from the database 208 and identify tuples which comply with the operator(s) and optional condition(s) received from the storage manager 320A.

After processing the retrieved tuples, the page cache management module 322A may transfer the complying tuples to the storage manager 320 which in turn may respond to the storage engine 316 with the complying tuples. The storage engine 316 may further propagate up the complying tuples to the query engine 314 which further transfers the complying tuples to the request manager 310 which may output the complying tuples 252.

As seen in the model 300B, in which the storage engine 316 bypasses at least some of the modules and services of the OS 220 for loading data retrieved from the storage 206 to the high speed memory, the storage engine 316 may integrate an adjusted direct access memory management module 322, for example, a buffer pool management module 322B and/or the like adapted to process tuples retrieved from the database 208 and identify tuples which comply with the operator(s) and optional condition(s) received from the query engine 314. Since, the buffer pool management module 322B may typically be integrated in the storage engine 316, the query semantics received from the query engine 314 are internally transferred (within the storage engine 316) to the buffer pool management module 322B. The buffer pool management module 322B may use the storage manager 320 for retrieving data, specifically tuples of the database 208 from the storage 206.

After processing the retrieved tuples, the buffer pool management module 322B may transfer the complying tuples to the storage engine 316 which in turn may propagate up the complying tuples to the query engine 314. The query engine 314 may further transfer the complying tuples to the request manager 310 which may output the complying tuples 252.

Optionally, as seen in both models 300A and 300B, the tuples processing is split between the query engine 314 and the memory management modules 322, specifically the page cache management module 322A and/or buffer pool management module 322B.

In such cases, the query engine 314 may propagate down to the storage engine only part of operators and/or conditions defined by the input query 250 while applying one or more other operators and/or conditions defined by the input query 250 which are not propagated down to the storage engine 316. In such case, the tuples identified by the memory management modules 322 (e.g. Page cache management module 322A and/or Buffer pool management module 322B) to comply with the propagated operator(s) and optionally with the condition(s) are partially complying tuples which are further processed by the query engine 314 which identifies the final complying tuples 252 and provides them to the request manager 310 adapted to output them.

The decision of which operator(s) and condition(s) are propagated down to the memory management modules 322 and which operator(s)/condition(s) are applied (processed) by the query engine 314 may be done by one or more modules of the RDBMS 210, for example, the query engine 314, the storage engine 316 or a dedicated software module integrated in the RDBMS 210.

After receiving the complying tuples from the storage engine 316 and optionally processing the received tuples according to one or more operators and/or condition(s) which were not propagated down, the query engine 314 may deliver the complying tuples 252 to the request manager 310 which may output the complying tuples 252 in response to the query 250.

Reference is made once again to FIG. 1.

As shown at 102, the process 100 starts with the request manager 310 receiving a query 250 directed to the database 208. The query 250 may typically be constructed using a high-level declarative query language, SQL and/or the like. The query 250 is naturally constructed according to the type of the RDBMS 210.

The request manager 310 may further allocate and schedule resources for executing the query 250 as known in the art. The request manager 310 may then transfer the query 250 to the parser 312 which may use regular expressions to parse and analyze the query 250, for example, the SQL query as known in the art.

After parsed by the parser 312, the query engine 314 may extract from the query 250 one or more relational operators and optionally one or more conditions each associated with a respective one of the operator(s). These relational operators may include, for example, select, project, aggregate, join a/or the like which may each be associated with one or more conditions. The query engine 314 may further generate a query plan composed of an AST of the extracted relational operators and tables as known in the art.

As shown at 104, the query engine 314 may propagate down (transfer) one or more of the operators and their respective conditions (if such exist) to the storage engine 316. Optionally, the query engine 314 concurrently transfers multiple operators and their respective conditions (if such exist) to the storage engine 316.

Typically, in legacy RDBMS implementations, the query engine 314 requests the storage engine 316 to retrieve the tuples from the database 208 and the query engine 314 processes the retrieved tuples to identify the complying tuples 352 which comply with the operators(s) and optionally with the condition(s).

However, the API between the query engine 314 and the storage engine 316 may be extended to include query semantics API supporting propagation (transfer) of the query semantics, i.e. the operators(s) and optionally the condition(s) from the query engine 314 to the storage engine 316. Moreover, the query semantics API is applied to support transfer of tuples complying with the propagated operator(s) and optionally with the condition(s) from the storage engine 316 to the query engine 314. Both the query engine 314 and the storage engine 316 may be therefore adjusted to support the query semantics API.

Figure 4:
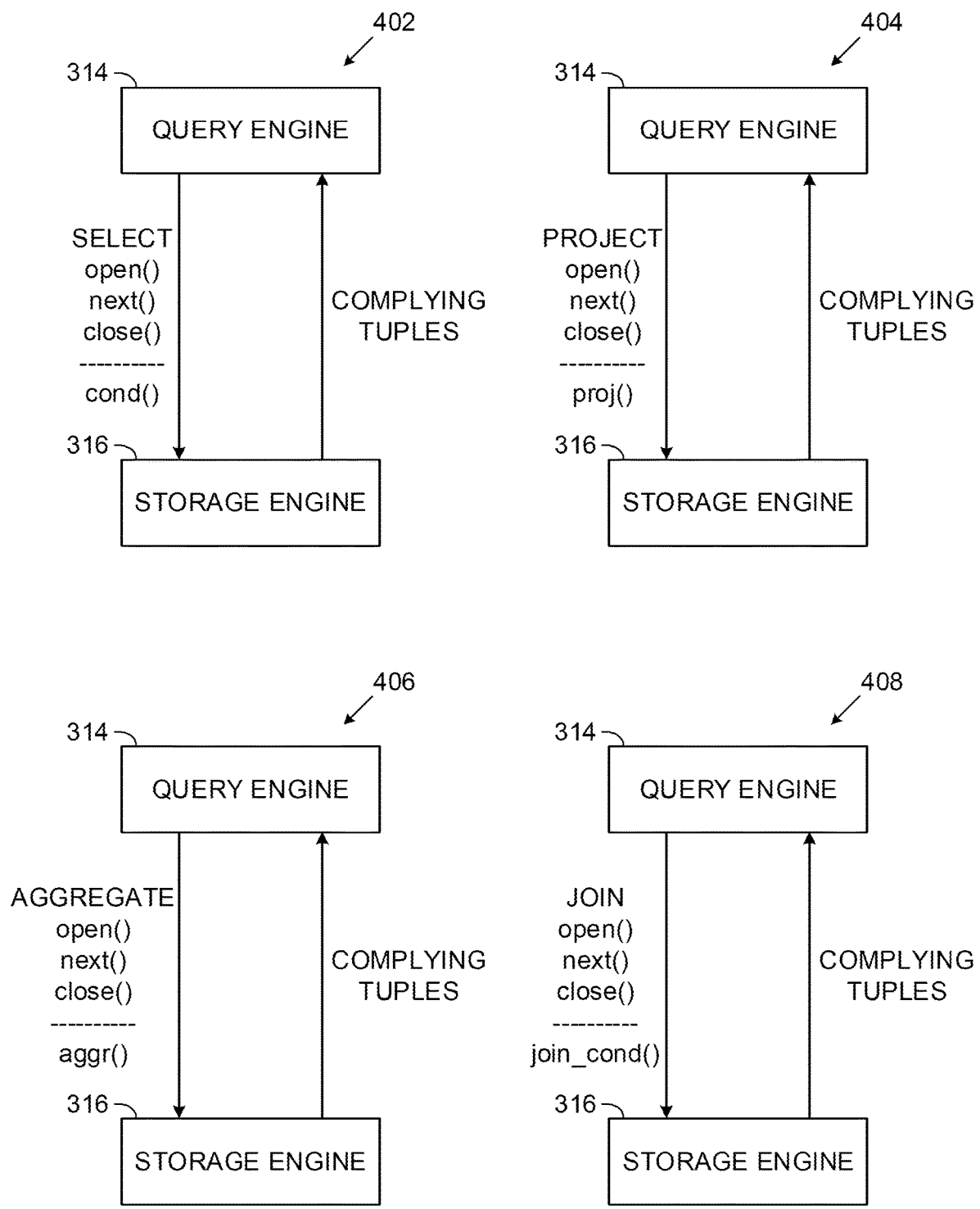
FIG. 4 presents schematic illustrations of an exemplary query semantics API applied for propagating exemplary query operators and conditions from a query engine to a storage engine, according to some embodiments.

Reference is now made to FIG. 4, which presents schematic illustrations of an exemplary query semantics API applied for propagating exemplary query operators and conditions from a query engine such as the query engine 314 to a storage engine such as the storage engine 316, according to some embodiments.

As shown at 402, using the query semantics API, the query engine 314 may transfer (propagate) condition(s) of the select operator to the storage engine 316 using a cond ( ) function added to the application programming interface (API) of the legacy RDBMSes which typically includes open( ) next( ) and close( ) functions. Therefore in the legacy RDBMS(s) the query engine may request the storage engine to provide a table of tuples and may then process the received tuples to identify the complying tuple(s) 252 complying with the condition(s) of the select operator. In contrast, the adjusted storage engine 316 may provide the query engine 314 only tuples which comply with the condition(s) associated with the select operator.

As shown at 404, using the query semantics API, the query engine 314 may transfer (propagate) condition(s) of the project operator to the storage engine 316 using a proj ( ) function added to the API of the legacy RDBMSs which typically includes the open( ) next( ) and close( ) functions. Therefore, in the legacy RDBMS(s) the query engine may request the storage engine to provide the table of tuples and may then process the received tuples to identify the complying tuple(s) 252 complying with the condition(s) of the project operator. In contrast, the adjusted storage engine 316 may provide the query engine 314 only tuples which comply with the condition(s) associated with the project operator.

As shown at 406, using the query semantics API, the query engine 314 may transfer (propagate) condition(s) of the aggregate operator (e.g., maximum, minimum, average, etc.) to the storage engine 316 using an aggr( ) function added to the API of the legacy RDBMSs which typically includes the open( ) next( ) and close( ) functions. Therefore in the legacy RDBMS(s) the query engine may request the storage engine to provide the table of tuples and may then process the received tuples to identify the complying tuple(s) 252 complying with the condition(s) of the aggregate operator. In contrast, the adjusted storage engine 316 may provide the query engine 314 only tuples which comply with the condition(s) associated with the aggregate operator.

As shown at 408, using the query semantics API, the query engine 314 may transfer (propagate) condition(s) of the join operator to the storage engine 316 using a join_cond( ) function added to the application programming interface (API) of the legacy RDBMSs which typically includes the open( ) next( ) and close( ) functions. Therefore, in the legacy RDBMS(s) the query engine may request the storage engine to provide the table of tuples using and may then process the received tuples to identify the complying tuple(s) 252 complying with the condition(s) of the join operator. In contrast, the adjusted storage engine 316 may provide the query engine 314 only tuples which comply with the condition(s) associated with the join operator.

Optionally, the query engine 314 is configured to apply one or more operators included in the query to one or more tuples received from the storage engine 316 in response to one or more other operators propagated down to the storage engine 316. This means that processing of the tuples in the database 208 according to the operators and conditions of the query may be split between the query engine 314 and lower level software modules, for example the memory management modules 322 such as the memory management modules 322A and/or 322B. For example, assuming an SQL query constructed for a certain query 250 comprises two operators, for example, a select operator (with one or more conditions) and an aggregate operator. In such case, the query engine 314 may transfer the select operator optionally coupled with its condition(s) to the storage engine 316 and receive in return one or more tuples complying with the select operator. The query engine 314 may then apply the aggregate operator to the tuple(s) received from the storage engine 316 to produce the response, i.e. the complying tuple(s) 252.

Reference is made once again to FIG. 1.

As shown at 106, the storage engine 316 may propagate the query semantics, i.e., one or more of the operators and their respective conditions (if such exist) to the memory management module 322, for example, the page cache management module 322A or the buffer pool management module 322B.

In cases in which the memory management module 322 is inherent to the OS 220, for example, the page cache management module 322A, the storage engine 316 may be configured to transfer the query semantics to the storage manager 320 which may in turn propagate the query semantics to the page cache management module 322A.

Typically, in legacy RDBMS implementations, the storage engine 316 requests the OS storage manager 320 to retrieve data, specifically one or more data segments from the storage 206, for example, a page, a buffer and/or the like. The storage engine 316 may then extract the tuples of the database 208 from the retrieved data. The storage engine 316 transfers the tuples to the query engine 314 which may process the tuples to identify the complying tuples 252.

However, the OS API between the storage engine 316 and the storage manager 320 may be extended to support propagation (transfer) of the query semantics, i.e. the operators(s) and optionally the condition(s) from the storage engine 316 to the storage manager 320. Moreover, the extended OS API is applied to support transfer of tuples complying with the propagated operator(s) from the storage manager 320 to the storage engine 316. Both the storage engine 316 and the storage manager 320 may be adjusted to support the extended OS API.

For example, assuming the storage manager 320 is a VFS, the extended OS API may include one or more adjusted and/or extended system calls to support propagation (transfer) of the query semantics, i.e. the operator(s) and optionally its condition(s) if exist.

Figure 5:
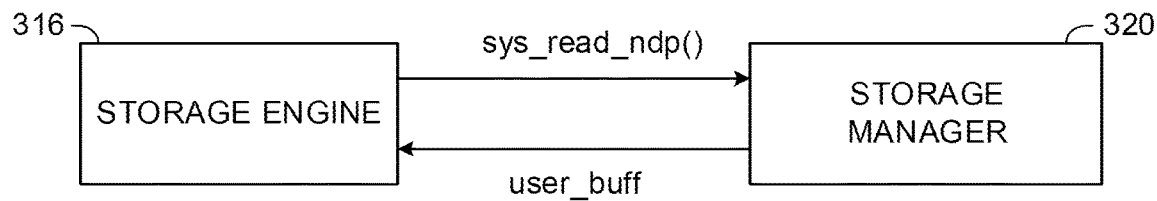
FIG. 5 is a schematic illustration of an exemplary OS API extended to support propagation of query operators and conditions from a storage engine to an adjusted VFS and/or the like storage manager, according to some embodiments.

Reference is now made to FIG. 5, which is a schematic illustration of an exemplary OS API extended to support propagation of query operators and conditions from a storage engine to an adjusted storage manager, according to some embodiments.

Typically, a legacy storage manager such as the storage manager 320, for example, a VFS and/or the like is deployed to manage accesses to a storage medium such as the storage 206, specifically for accessing a database such as the database 208 stored in the storage 206. Such legacy storage manager 320 may support an OS API comprising one or more system calls which allow high-level software modules, for example, the storage engine 316 to access the storage 206 and retrieve tuples stored in the database 208.

However, an adjusted storage manager 320 may be adjusted to support an extended OS API supporting propagating down (transferring) the query semantics, i.e. the operator(s) and optionally the condition(s) from the storage engine 316 to the storage manager 320. For example, a legacy sys_read( ) system call of the OS 220 which is directed to access the legacy storage manager 320, for example, the VFS for reading data from the database 208 may typically return data retrieved from the storage 206 in a user buff (user buffer) allocated for the higher level software module such as the storage engine 316. The legacy sys_read( ) system call may be extended to a respective sys_read_ndp( ) system call to further include one or more parameters, for example, ndp_argc, ndp_argv and/or the like. The parameters may be used to map one or more arguments, specifically the operator(s) and optionally the condition(s) defined by and/or extracted from the query 250. As such, using the extended OS API, specifically, the sys_read_ndp( ) system call, the storage engine 316 may transfer the parameters, i.e. one or more of the query operators and conditions to the storage manager 320. Moreover, the complying tuples may be returned to the storage engine 316 in the user buffer allocated for the storage engine 316.

The sys_read_ndp( ) system call may be adjusted, constructed and/or defined in the extended OS API using one or more implementations. For example, similarly to as is done in the C programming language, the parameter ndp_argc may specify a number of arguments, an argument count and/or the like. Similarly, the parameter ndp_argv may specific an array of pointers to the arguments, an argument vector and/or the like. Such an implementation of the sys_read_ndp( ) system call is presented in an exemplary code excerpt 1 below. Naturally, other implementation for adjusting the system calls may be apparent to a person skilled in the art.

Code Excerpt 1:

```
ssize_t sys_read_ndp (int fd,
    void * buf,
    size_t count,
    char ** ndp_argv,
    ssize_t ndp_argc
    );
```

Similarly, a sys_write_ndp( ) system call may be adjusted, constructed and/or defined in the extended OS API.

As described herein above, the storage manager 320 may in turn propagate the query semantics to the page cache management module 322A

Figure 6:
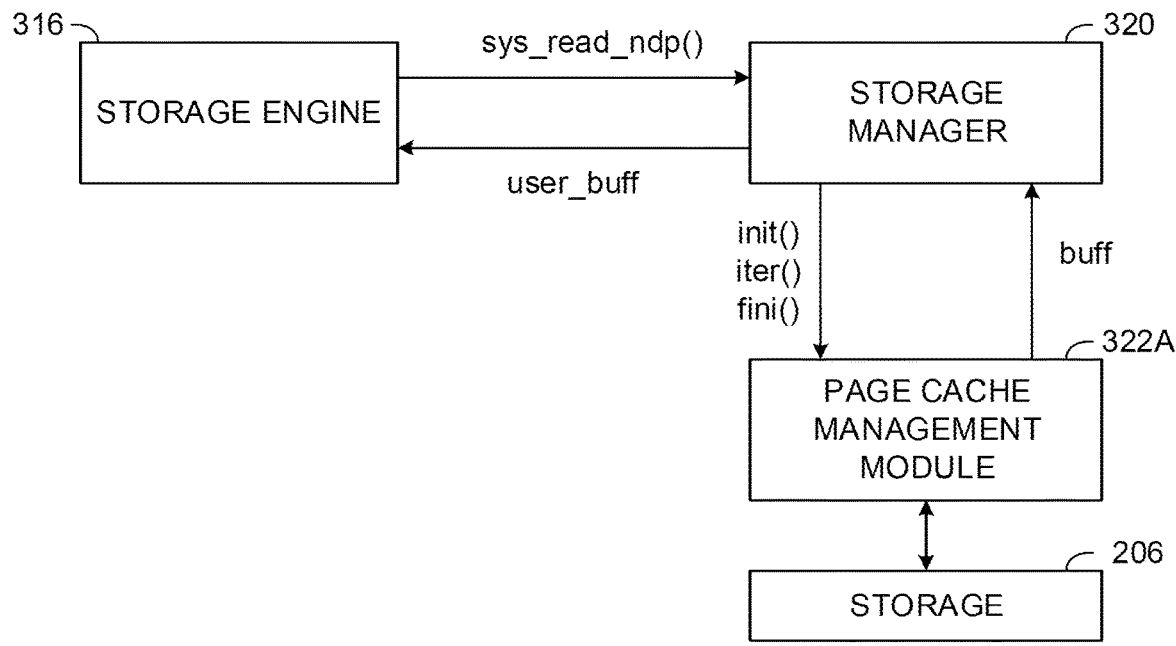
FIG. 6 is a schematic illustration of an exemplary adjusted page cache management module utilized by an adjusted storage manager (VFS and/or the like) to process tuples of a database retrieved from a storage medium, according to some embodiments.

Reference is now made to FIG. 6, which is a schematic illustration of an exemplary page cache management module utilized by an adjusted storage manager (VFS and/or the like) to process tuples of a database retrieved from a storage medium, according to some embodiments. An exemplary page cache management module such as the page cache management module 322A may be adjusted to process the tuples in the loaded pages to identify tuple(s) compliant with the operator(s) and conditions propagated down from a storage manager such as the VFS storage manager 320A, for example, the VFS and/or the like. The storage manager 320 may employ an extended page cache API to propagate the query semantics, specifically the operator(s) and optionally the condition(s) to the page cache management module 322A.

The legacy page cache management module is typically configured to load data chunks, specifically pages from a storage medium such as the storage 206 to the high speed memory. The adjusted page cache management module 322A extends functionality of the legacy page cache management module as it is configured to process the tuples loaded from the database 208 and stored in one or more pages in the page cache to identify tuple(s) complying with the operator(s) and conditions. The page cache management module 322A may apply one or more functions, for example, an init( ), an iter( ) a fini( ) and/or the like for receiving the query semantics from the storage manager 320 and processing the tuples in the loaded page(s).

The adjusted page cache management module 322A, in particular the init( ), an iter( ) a fini( ) functions may be implemented by dynamically loading a query semantics processing module implemented to support the pushed down relational operators. The query semantics processing module is designed and configured to recognize both the query semantics and their context as well as the page and tuple structure in order to support processing of the loaded pages to search for tuple(s) complying with the operator(s) and optional condition(s) propagated all the way down from the query engine 314 through the storage engine 316 and the storage manager 320.

Since the init( ) iter( ) and fini( ) functions may be implemented inside a kernel module of the OS 220, the query semantics processing module comprising the adjusted functions may be dynamically loaded using one or more functions, features and/or services provided by the OS 220. For example, in case the OS 220 is Linux, the query semantics processing module may be dynamically loaded using "insmod" command to insert a module into the Linux kernel optionally coupled with "rmmod" command to remove a module. In another example, again assuming the OS 220 is Linux, the query semantics processing module may be dynamically loaded using eBPF virtual machine to deploy the query semantics processing module in the Linux kernel page cache.

The query semantics processing module may be dynamically loaded to the database system 200, specifically to the kernel of the OS 220 while loading the RDBMS 210. However, it is possible to load the query semantics processing module to the kernel of the OS 220 prior to loading the RDBMS 210.

The page cache management module of the OS 220 may thus export the register function which modules, including kernel modules may use to instantiate their implementations of the adjusted init( ) iter( ) and fini( ) functions.

The adjusted page cache management module 322A may be oblivious to code executed inside the init( ) iter( ) and fini ( ) functions which comprise the additional processing of the loaded pages to search for complying tuple(s) 252 using one or more types of computation not necessarily limited to query operator(s) related to the RDBMS 210. However, in the implementation of the RDBMS 210, the init( ) iter( ) and fini( ) functions may be designed and configured for processing the tuples according to the pushed down query semantics.

The page cache management module 322A may initiate (call) the init( ) function before accessing the first loaded page to read the loaded tuples. The init( ) function may initialize the required data structures for storing the query semantics, i.e. the operator(s) and optional condition(s).

The page cache management module 322A may then initiate (call) the adjusted iter( ) function for every page requested by the NDP system call. The page cache management module 322A may execute the iter( ) function for each page after being loaded in the page cache to process the tuples in the respective page according to the stored operator(s) and optional condition(s) to identify tuple(s) complying with the operator(s) and conditions. Executing the iter( ) function, the page cache management module 322A may store the results, i.e. the identified tuple(s) in a buffer which may be further copied to a user buffer allocated for the storage engine 316.

After executing the last iter( ) function and hence processing the last page loaded in the page cache, the page cache management module 322A may initiate (call) the fini ( ) function to free the data structures used for storing the query semantics, i.e. the operator(s) and optional condition(s).

In cases in which the memory management module 322 bypasses the inherent memory management modules of the OS 220, for example, in cases where the storage engine 316 employs Direct I/O and or the like, the storage engine 316 may be configured and/or adjusted to transfer the query semantics to the buffer pool management module 322B. In such cases, as described herein after in FIG. 7, the API may be adjusted and/or extended to support propagation of the query semantics, i.e. the operators(s) and optionally the condition(s) from the storage engine 316 to the buffer pool management module 322B. Moreover, the extended API may be applied to support transfer of tuples complying with the propagated operator(s) from the buffer pool management module 322B to the storage engine 316. Naturally, the storage engine 316 and the buffer pool management module 322B may be adjusted to support the extended API. Note that in this case, the interface between the buffer pool management module 322B and the storage manager 320 does not change with respect to the legacy RDBMS.

Figure 7:
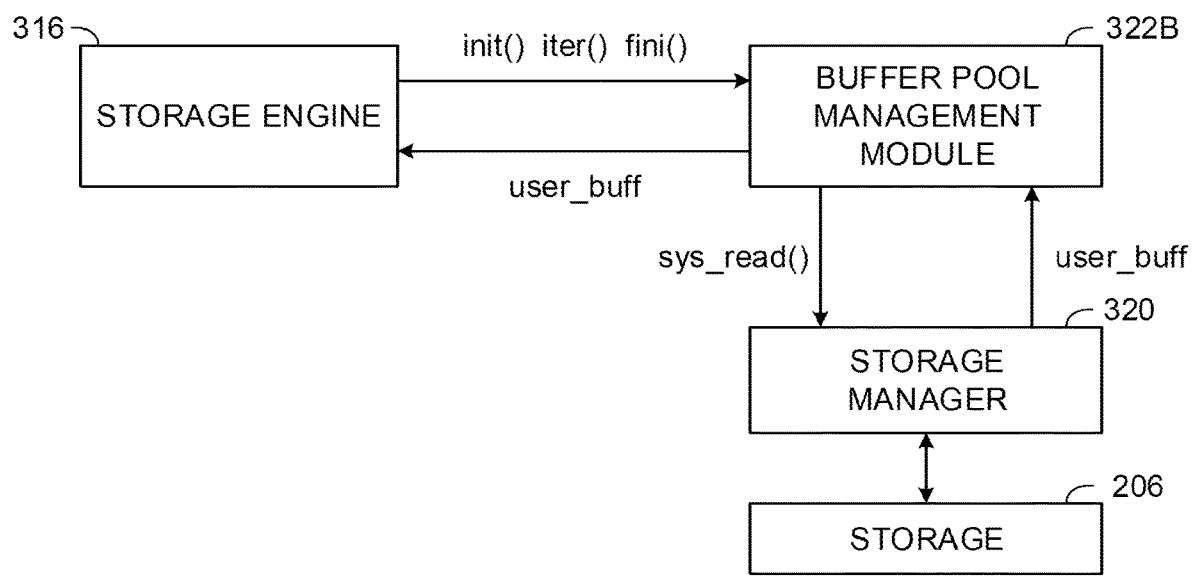
FIG. 7 is a schematic illustration of an exemplary adjusted buffer pool management module utilized by a storage engine to process tuples of a database retrieved from a storage medium using a storage manager (VFS and/or the like), according to some embodiments.

Reference is now made to FIG. 7, which is a schematic illustration of an exemplary adjusted buffer pool management module utilized by a storage engine to process tuples of a database retrieved from a storage medium using a storage manager (VFS and/or the like), according to some embodiments. An adjusted buffer pool management module 322B may be configured to support propagation of the operators(s) and optionally the condition(s) from a storage engine such as the storage engine 316.

Similarly to as described for the adjusted page cache management module 322A, the storage engine 316 which typically integrates the buffer pool management module 322B may use one or more functions such as, for example, the init( ) iter( ) and fini( ) functions for receiving the query semantics and processing the tuples retrieved from the storage medium 206.

The buffer pool management module 322B may use one or more services of an OS such as the OS 220, specifically a storage manager such as the storage manager 320 for accessing the storage 206 and retrieving data, in particular the tuples of a database such as the database 208 stored in the storage 206.

As described for the page cache management module 322A, the adjusted buffer pool management module 322B, in particular the init( ), an iter( ) a fini( ) functions may be implemented by dynamically loading the query semantics processing module using the dynamic loading functions, features and/or services provided by the existing toolchains (compilers, linkers, etc.). The query semantics processing module, as described for the page cache management module 322A may include the init( ), an iter( ) a fini( ) functions and logic to support transfer (propagate) of the query semantics to the lower level software modules, i.e. to the buffer pool management module 322B and optionally for transferring complying tuple(s) back to the storage engine 316 and further on to the query engine 314.

Reference is made once again to FIG. 1.

As shown at 108, the memory management modules 322, for example, the page cache management module 322A and/or the buffer pool management module 322B may process the tuples retrieved from the database 208 according to the operator(s) and optionally according to the condition(s) propagated down from the storage engine 316 and identify the tuples complying with the propagated operator(s) and optionally with the condition(s).

After retrieving data, specifically the tuples of the database 208 from the storage 206, the memory management modules 322 may process the retrieved tuples according to the propagated operator(s) and optional condition(s) as known in the art to identify complying tuple(s) 252.

For example, in case the tuples are processed by the page cache management module 322A, the page cache management module 322A which is typically used by legacy OSes for loading data pages from the storage 206 to the high speed memory may be adjusted to further process the tuples in the loaded pages to identify tuple(s) compliant with the operator(s) and conditions propagated down from the storage engine 316 via the storage manager 320.

In another example, in case the tuples are processed by the adjusted buffer pool management module 322B, the adjusted buffer pool management module 322B may process the retrieved tuples to identify tuple(s) complying with the propagated operator(s) and optionally with the condition(s) propagated down from the storage engine 316.

As shown at 110, the memory management module 322 may return the complying tuple(s) (if found) to the storage engine 316. As such the storage engine 316 may receive only the tuple(s) which comply with the operator(s) and optionally with the condition(s) rather than all tuples retrieved from the database 208 as may be done by the existing RDBMS architectures in which all tuples are returned by the legacy memory management module to the legacy storage engine.

For example, in case the tuples are processed by the OS inherent page cache management module 322A, the adjusted page cache management module 322A may transfer the complying tuple(s) to the storage manager 320 which may apply the extended OS API to transfer the complying tuple(s) to the storage engine 316, for example, to a user buffer allocated for the storage engine 316.

In another example, in case the tuples are processed by the direct I/O access buffer pool management module 322B, the adjusted buffer pool management module 322B typically integrated in the storage engine 316 may internally transfer the complying tuples to the storage engine 316 which may store them in the user buffer allocated for the storage engine 316.

As shown at 112, the storage engine 316, using the query semantics API, returns to the query engine 314 tuple(s) identified by the memory management module 322 to comply with the propagated down operator(s) and optional condition(s).

As shown at 114, the query engine 314 may transfer the complying tuples 252 to the request manager 310 which may output the complying tuples 252.

Optionally as described herein before, the query engine 314 propagates down only part of the operators extracted from the query 250 to the storage manager. After receiving the tuples complying with the propagated operator(s) from the storage engine 316, the query engine 314 may apply to the returned tuple(s) one or more other operators which were not propagated down to identify the complying tuples 252.

Figure 8A:
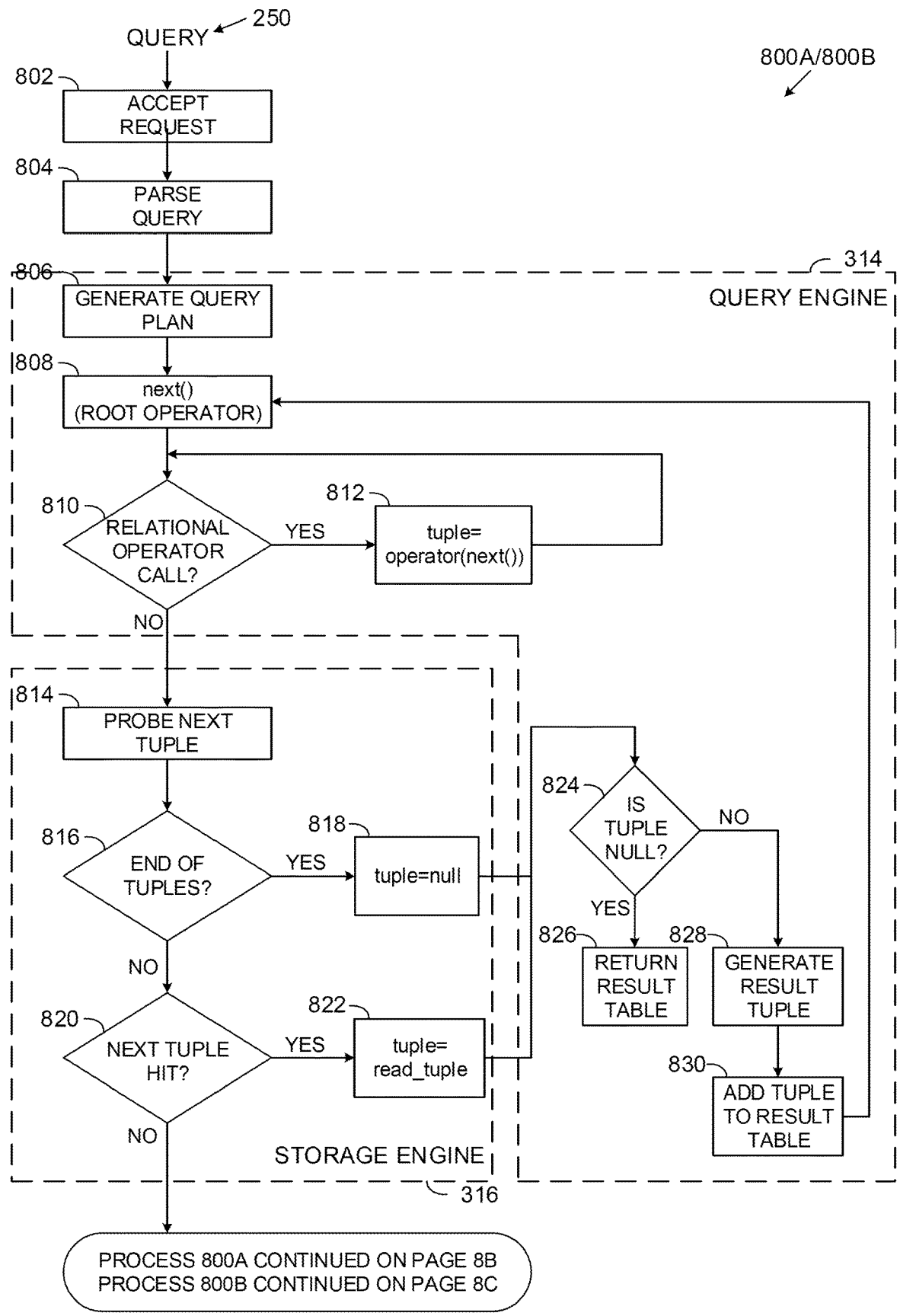
FIG. 8A, FIG. 8B and FIG. 8C present a flowchart of an exemplary processes of propagating query operators and conditions from a query engine through a storage engine to adjusted memory management modules, according to some embodiments, or an adjusted storage engine buffer pool management module adjusted to process tuples of a database retried from a storage manager (VFS and/or the like), according to some embodiments.
Figure 8B:
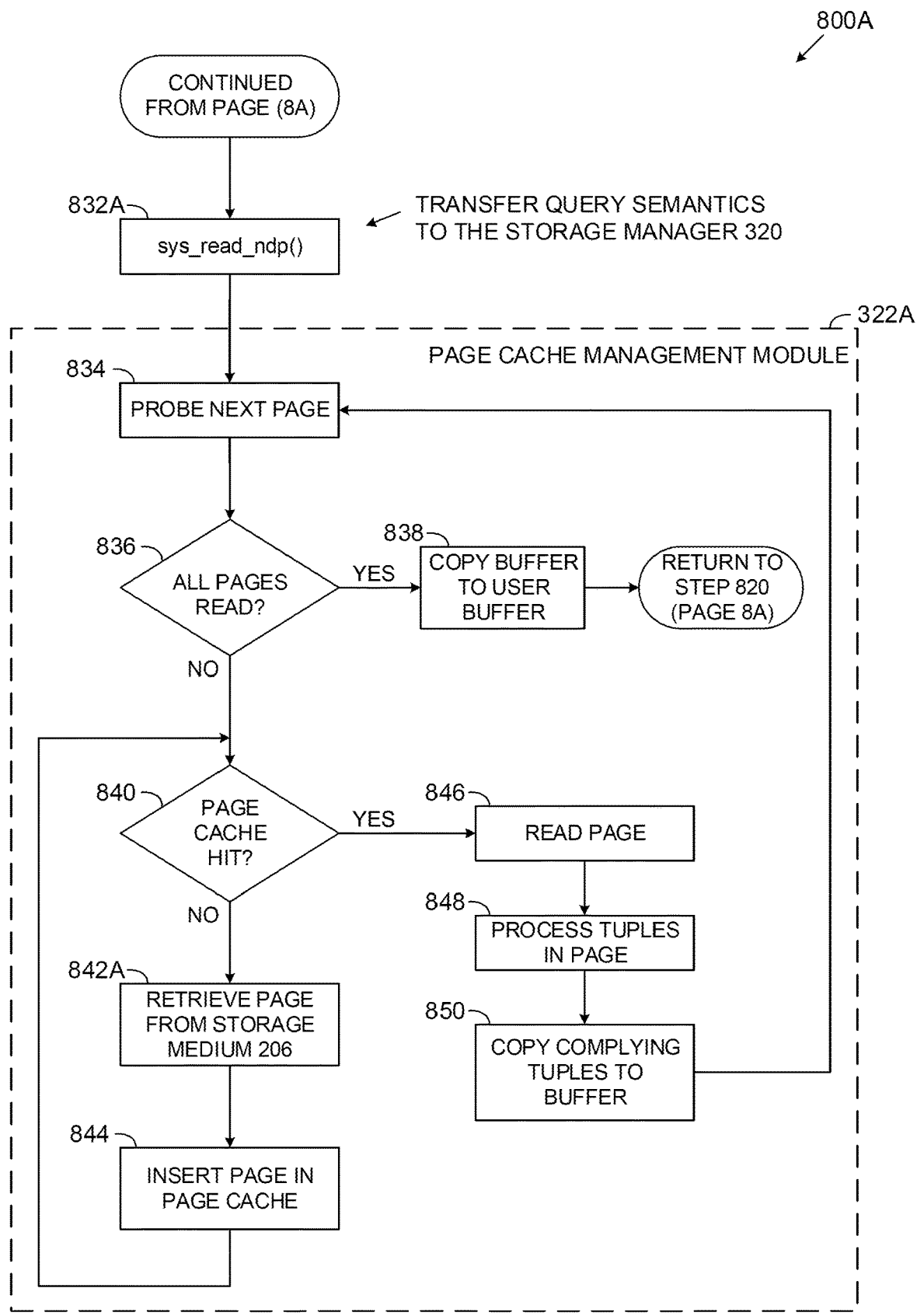
Figure 8C:
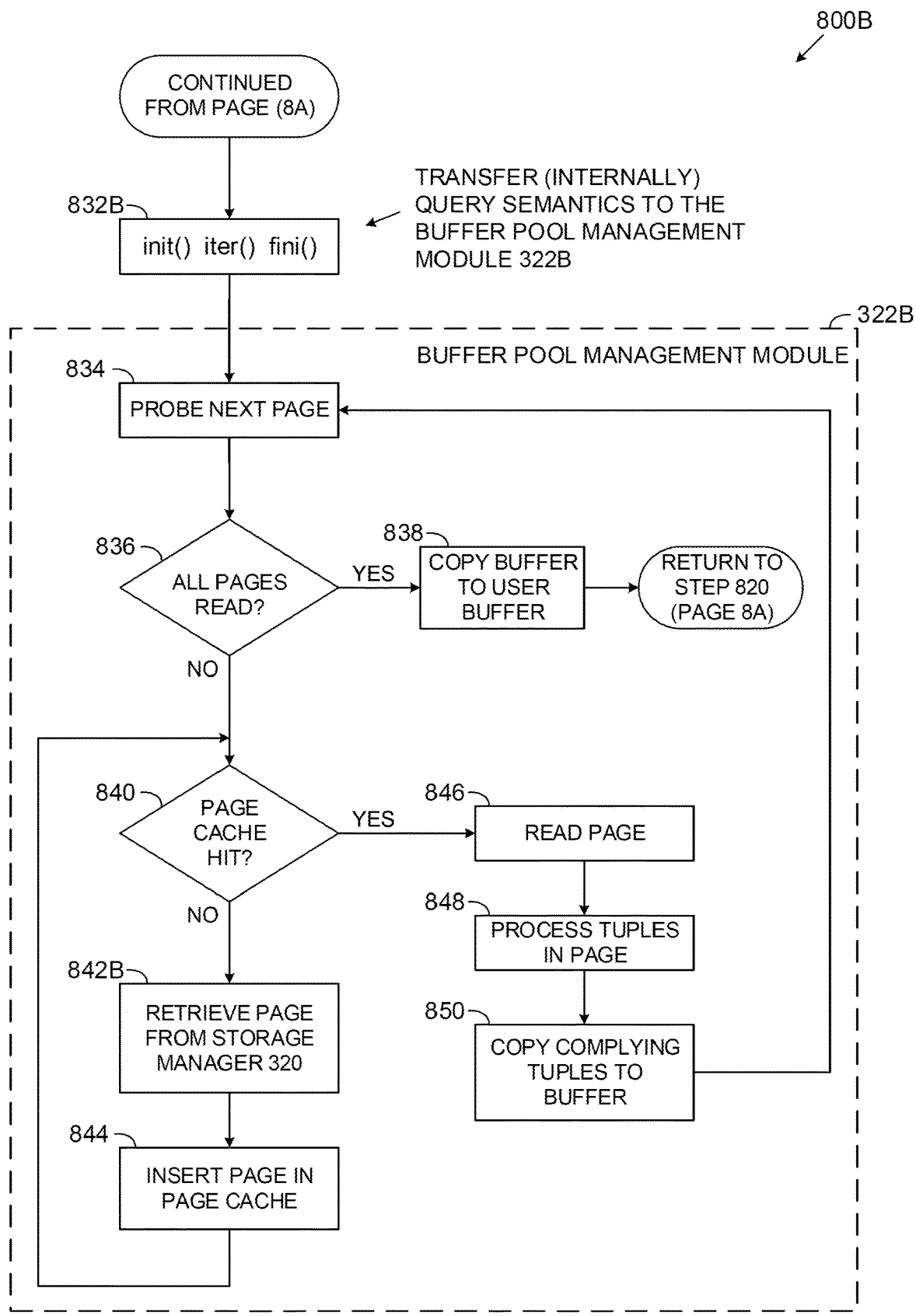

Reference is now made to FIG. 8A, FIG. 8B and FIG. 8C, which present a flowchart of an exemplary processes of propagating query operators and conditions from a query engine through a storage engine to adjusted memory management modules adjusted to process tuples of a database retrieved from a storage medium, according to some embodiments. Two exemplary processes 800A and 800B which are variants of a process such as the process 100 may be executed by a database system such as the database system 200. In particular the processes 800A and 800B are executed by the database system 200 executing an adjusted RDBMS such as the RDBMS 210 to manage a relational database such as the database 208 stored in a storage medium such as the storage medium 206. The RDBMS 210 includes a query engine such as the query 314 adjusted to propagate the query semantics (i.e., the operator(s) and optionally the condition(s)) to a storage engine such as the storage engine 316 employing one or more memory management module(s) adjusted to apply the propagated operator(s) and optional condition(s) to tuples retrieved from the database 208 in order to identify complying tuples and responding to the storage engine with these complying tuple(s).

The process 800A may be executed by an RDBMS 210 comprising a storage engine such as the storage engine 316 utilizing an adjusted storage manager such as the storage manager 320 of an OS such as the OS 220, for example, the VFS storage manager using an adjusted memory management module inherent to the OS 220, specifically a page cache management module such as the page cache management module 322A adjusted to process the tuples retrieved from the database 208 by accessing the storage medium 206.

The process 800B may be executed by an RDBMS 210 comprising the storage engine 316 which integrates a memory management module such as the buffer pool management module 322B adjusted to process the tuples retrieved from the database 208 using the storage manager 320 for accessing the storage medium 206.

As described herein before most steps of the processes 800A and 800B are similar. The steps 802 through 830 are conducted by the query engine 314 and the storage engine 316 which are identical in both implementations of the RDBMS 210 and are therefore similar in both processes 800A and 800B. In the lower level in the first implementation, i.e., in process 800A, the storage engine 316 transfers the query semantics to the storage manager 320 while in the second implementation, i.e., in process 800B, the storage engine 316 (internally) transfers the query semantics to the buffer pool management module 322B which is typically integrated in the storage engine 316. The syntax in respective steps 832A and 832B is therefore different to comply with the respective software modules.

In addition, since the page cache memory management module 322A applied in the process 800A is the software module which processes the tuples and also accesses the storage medium 206, the page cache memory management module 322A retrieves the pages from the storage medium 208 as described in step 842A. This differs from the process 800B in which the buffer pool management module 322A processes the tuples after retrieved by the storage manager 320. Therefore as described in step 842B, the buffer pool management module 322A retrieves the pages using the storage manager 320.

As shown at 802, the processes 800A and 800B start with a request manager such as the request manager 310 receiving a query such as the query 250 as described in step 102 of the process 100. The request manager 310 may further allocate and schedule resources for processing the query 250.

As shown at 804, using regular expressions, a parser such as the parser 312 may parse the received query 250 as known in the art to identify query elements defined by the query 250.

As shown at 806, the query engine 314 may create a query plan for one or more operators extracted from the query elements identified by the parser 312 as described in step 102 of the process 100. The query engine 314 may further associate one or more of the operator(s) with one or more conditions (if exist) which are further extracted from the query elements.

As shown at 808, the query engine 314 instructs processing tuples in the database 208 according to the query plan, which is defined as an Abstract Syntax Tree (AST) comprising a plurality of nodes which may each be a relational operator or a table access as known in the art. Each of the nodes uses the same API (i.e., open, next, close) to communicate with its children nodes. The propagation of calls in the AST starts from top-most operator (root), which receives calls and propagates them recursively. For clarity, the initial open( ) call and the ending close( ) call are not presented. The next( ) calls instruct the next operator to reply with the next tuple. As such, the root of the AST (i.e., the first operator), calls the next( ) API function of its child(s), to return the first tuple of the child(s). This is done recursively through each branch of the AST until reaching a child node which is a table access, i.e., requires access to the tuples of the database 208.

As shown at 810, which is a conditional step, in case the (currently processed) node in the AST is a relational operator, i.e. a query engine call, the process 800A/800B branches to 812. In case the next node is not a relational operator, i.e. a table access which is handled by the storage engine 316, the storage engine 316 needs to be called and the process 800A/800B branches to 814. Typically, the top-levels of the AST are operators and only the bottom levels are table accesses. Therefore, essentially only the bottom relational operators actually need to read the tuples from the database 208 while the rest of the operators may read the tuples from next( ) functions of the lower level relational operators, depending on the query plan. Therefore in case the next node in the AST is a relational operator, the process branches to 812 while in case the next node in the AST is a table access, the storage engine 316 needs to be invoked and the process branches to 814.

As shown at 812, since the current node is an operator, the tuple to be processed according to the current operator may be retrieved from the next lower level operator and the process branches back to 810 to continue propagating down the AST.

As shown at 814, the query engine 314 has finished propagating down the AST and hence has found a table access, in which case the control transitions to the storage engine 316 for retrieving the next tuple of the database table. The storage engine starts by probing for the next table in the storage engine 316; in other words, dictating whether there are still tuples to read from the table complying with the propagated operator(s) and optionally with the condition(s) and whether the next tuple of the table resides already in the storage engine 316.

As shown at 816, which is a conditional step, in case there are no more tuples to be processed in the database 208 complying with the propagated operator(s) and condition(s), specifically in the respective table(s) of the database 208, the process 800A/800B branches to step 818. In case there may be additional tuples in the respective table(s) of database 208, the process 800A/800B branches to step 820.

As shown at 818, there are no more tuples in the database complying with the propagated operator(s) and condition(s), and hence the storage engine 316 returns a null tuple.

As shown at 820, which is a conditional step, a tuple hit is checked to determine whether the next tuple, which complies with the propagated operator(s) and conditions(s), is available in the storage engine 314. In case the next tuple is available in the storage engine 314, the process 800A/800B branches to step 822. For example, assuming a set of pages was previously retrieved, in response to operator(s) and condition propagated down, one or more tuples complying with the operator(s) and optionally with the condition(s) are received from the respective memory management module, i.e., from the page cache management module 322A for the process 800A or from the buffer pool management module 322B for the process 800B. In case the next tuple is not available in the storage engine 314, the process 800A/800B branches to step 828.

As shown at 822, the next tuple, which complies with the propagated operator(s) and conditions(s), is available in the storage engine 314. Therefore, the storage engine 314 simply returns the next tuple to the query engine 314.

As shown at 824, which is a conditional step, the query engine 314 checks whether the tuple returned from the storage engine 314 is the null tuple. In such case, the process 800A/800B branches to step 826. In the case the next tuple is not the null tuple, and hence there is at least another tuple complying with the operator(s) and optionally with the condition(s), the process 800A/800B branches to step 828.

As shown at 826, a null tuple may indicate there are no more tuples to be processed. The query engine 314 may therefore return a result table comprising the tuples complying with both the operator(s) and optional condition(s) which were propagated down, and the operator(s) and optionally condition(s) which were processed by the query engine 314. This step indicates that the query engine 314 has finished processing all tuples. Therefore, the entire processing of the query has finished and we can return the result table as the query's reply.

As shown at step 828, in case the tuple is not null, a result tuple is generated by applying the operators of the query engine 314 backwards (i.e., unrolling the recursion), to finally generate a tuple that complies with all the operator(s) and conditions(s) of the query. Note that applying the operators in the query engine refers only to the operators which were not propagated down. The non-null tuples already comply with the propagated down operator(s) and optional condition(s).

As described herein before, during the initial processing of the query, one or more of the software modules of the RDBMS 210, for example, the query engine 314 may decide (select) which operator(s) and optionally which condition(s) are to be propagated down and be applied by the memory management modules 322 and which operator(s) and optionally which condition(s) are to be applied by the query engine 314 itself. Therefore, the operator(next( ) at step 812 calls and starts the recursion in the query engine 314 only for the operator(s) that are selected to be applied by the query engine 314. Moreover, the operator(s) and optional condition(s) selected to be applied by the memory management modules 322 may be propagated down to the storage engine only once after generating the query plan and are hence assumed to be already propagated down for each of the succeeding calls to the storage engine 316 (for the same query).

As shown at step 830, the generated tuple is added to the result table. The process 800A/800B may branch back to step 808 for repeating the entire process again. In other words, applying the aforesaid set of operators to the next tuple of the database 208, specifically to the table of tuples loaded from the database 208.

The process 800A/800B then branches back to the step 808 where the root operator of the query engine 314 initiates the whole process again for the next tuple.

As shown at 832A which is part of the process 800A, in case the next tuple is not available in the storage engine 316, using the added system call sys_read_ndp( ) the storage engine 316 transfers the query semantics, i.e. the operator(s) and optional condition(s) received from the query engine 314 to the storage manager 320, for example, the VFS layer. The storage manager 320 in turn transfers the query semantics to the page cache management module 322A used by the storage manager 320 to access the storage medium 206, specifically the database 208. As described herein before at step 828, the operator(s) and optional condition(s) selected to be applied and processed by the page cache management module 322A may be propagated down only once during the first call to the page cache management module 322A and should therefore not be propagated down again for subsequent accesses to the page cache management module 322A (for the same query).

As shown at 832B which is part of the process 800B, in case the next tuple is not available in the storage engine, the storage engine 316 transfers the query semantics, i.e. the operator(s) and optionally the condition(s) received from the query engine 314 to the buffer pool management module 322B. However, since typically the buffer pool management module 322B is part of the storage engine 316 this transfer of the query semantics may typically be an internal operation executed within the storage engine 316, for example, the functions init( ), iter( ) and fini( ).

Similarly to as described for the page cache management module 322A in step 832A, the operator(s) and optionally the condition(s) selected to be applied and processed by the buffer pool management module 322B may be propagated down to the storage engine only once after generating the query plan and should therefore not be propagated down again for subsequent accesses to the storage engine 316 (for the same query).

As shown at 834, the memory management module 322, either the page cache management module 322A in the process 800A or the buffer pool management module 322B in the process 800B probes for the next page of data of the database 208, specifically pages comprising data of the respective table.

As shown at 836, which is a conditional step, in case all pages of the database 208, specifically the pages comprising data of the respective table were loaded to the memory and processed, the process 800A/800B branches to step 836. In case there are additional pages comprising data of the respective table which were not loaded to the memory, the process 800A branches to step 838.

As shown at 838, after the memory management module 322 (i.e., the page cache management module 322A or the buffer pool management module 322B) completes processing all tuples of the respective table after loaded from the database 208, the memory management module 322 may copy complying tuples stored in a system buffer allocated for the memory management module 322 to a user buffer allocated for the storage engine 316. The process 800A/800B may then branch back to step 820 to transfer control to the query engine 314 which may initiate processing of the next tuple.

As shown at 840, which is a conditional step, in case of a page hit, i.e. the next page comprising the next tuple(s) is available (loaded) in the page cache, the process 800A/800B branches to step 846. In case of no page hit, i.e., the next page comprising the next tuple(s) is not available in a loaded page, the processes 800A and 800B branch to steps 842A and 842B respectively.

As shown at 842A which is part of the process 800A, the page cache management module 322A retrieves the next page from the storage 206.

As shown at 842B which is part of the process 800B, the buffer pool management module 322B retrieves the next page from the storage 206 using the storage manager 320, for example, the VFS.

As shown at 844, the page retrieved from the storage 206 is inserted (loaded) into the page cache or the buffer pool respectively.

As shown at 846, the page cache management module 322A or the buffer pool management module 322B fetches the next page from the page cache or the buffer pool respectively.

As shown at 848, the page cache management module 322A or the buffer pool management module 322B process all tuples in the currently processed page to identify tuple(s) complying with the operator(s) and optionally with the condition(s) received from the storage manager 320.

As shown at 850, the page cache management module 322A or the buffer pool management module 322B copy the complying tuple(s) identified in the processed page to the system buffer allocated for the memory management module 322, specifically the page cache management module 322A or the pool management module 322B.

The processes 800A and 800B are naturally iterative processes which may proceed to process all tuples retrieved from the database 208.

patent maturing from this application many relevant systems, methods and computer programs will be developed and the scope of the terms query semantics and query operators are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A system for enhancing processing of a query to a relational database, the system comprising:
   processing circuitry of a server, the server being associated with a database comprising a plurality of tuples, each of the plurality of tuples comprising a plurality of attributes, the processing circuitry being configured to:
   execute a query engine configured to receive a query, the query comprising at least one operator relating to at least one of the plurality of attributes;
   propagate the at least one operator to a storage engine,
   execute the storage engine, wherein the storage engine is configured to propagate the at least one operator to an adjusted memory management module, wherein the adjusted memory management module is configured to:
      retrieve, from a secondary storage device storing at least one part of the database, a plurality of tuples;
      write, into a cache, the plurality of tuples;
      filter, using the at least one operator, the plurality of tuples written into the cache and thereby determine a set of complying tuples, each complying tuple complying with the at least one operator, and
      return, to the storage engine, the set of complying tuples;
   propagate the set of complying tuples from the storage engine to the query engine; and
   output, by the query engine, each of the complying tuples received from the storage engine,
   wherein the adjusted memory management module is configured to perform the filtering, using the at least one operator, the plurality of tuples retrieved from the storage medium and thereby determine the set of complying tuples by implementing near data processing (NDP) to filter the tuples written into the cache at the point of data retrieval from the storage medium.

2. The system of claim 1, the query further comprising at least one condition relating to the at least one operator,
   wherein the processing circuitry is further configured to propagate the at least one condition to the adjusted memory management module,
   wherein the adjusted memory management module is configured to filter, using a combination of the at least one operator and the at least one condition, the tuples retrieved from the storage medium and thereby determine the set of complying tuples, each complying tuple complying with the at least one operator and the at least one condition.

3. The system of claim 1, wherein the query engine is configured to apply at least one additional operator included in the query to at least one of the complying tuples received from the storage engine to identify and output each complying tuple that complies with the at least one additional operator.

4. The system of claim 1, wherein the processing circuitry is configured to propagate the at least one operator to the storage engine using an extended query semantics Application Programming Interface (API) defined to support transfer of query semantics of a query language used by the query from the query engine to the storage engine.

5. The system of claim 1, wherein the storage engine is configured to propagate the at least one operator to the adjusted memory management module using an extended Operating System (OS) API defined to support propagation of the at least one operator from the storage engine to an adjusted storage manager inherent to an OS executed by the at least one processing circuitry,
   wherein the storage manager is configured to store data retrieved from the storage medium in an allocated buffer and propagate the at least one operator to the adjusted memory management module.

6. The system of claim 5, wherein the adjusted memory management module includes an adjusted page cache management module, the adjusted page cache management module being configured to extend functionality of a legacy page cache management module configured to load pages of data stored in the storage medium to a page cache of the OS to further process at least one of the plurality of tuples stored in at least one page loaded to the page cache to identify at least one of the complying tuples.

7. The system of claim 6, wherein the adjusted page cache management module is dynamically loaded to replace a legacy page cache management module.

8. The system of claim 1, wherein the adjusted memory management module includes an adjusted buffer pool management module configured to load pages of data stored in the storage medium to a buffer pool.

9. The system of claim 8, wherein the adjusted buffer pool management module is further configured to receive the at least one operator and process at least one of the plurality of tuples stored in at least one page loaded to the buffer pool to identify at least one of the complying tuples.

10. The system of claim 1, wherein the processing circuitry is configured to propagate the at least one operator to the storage engine using an extended Application Programming Interface (API) configured to support transfer, of query semantics of a query language used by the query, from the query engine to the storage engine, and
   wherein the storage engine is configured to propagate the at least one operator to the adjusted memory management module using an extended operating system (OS) API configured to support transfer, of the query semantics of the query language, from the storage engine to the adjusted memory management module.

11. The system of claim 10, wherein the cache is a page cache of the OS, and wherein the adjusted memory management module is an adjusted page cache management module configured to extend functionality of a legacy page cache management module configured to load pages of data stored in the secondary storage device to the page cache of the OS to further process at least one of the plurality of tuples stored in at least one page loaded to the page cache to identify at least one of the complying tuples.

12. The system of claim 10, wherein the cache is a buffer pool, and wherein the adjusted memory management module is an adjusted buffer pool management module configured to load pages of data stored in the storage medium to a buffer pool.

13. The system according to claim 10, wherein the query engine is a relational database management system (RDBMS) software module configured to process the plurality of tuples retrieved from the secondary storage device, and wherein the storage engine is an RDBMS software module configured to access the secondary storage device to retrieve and/or commit tuples in the secondary storage device.

14. The system according to claim 13, wherein the query engine is a software module configured to generate a query plan comprising an Abstract Syntax Tree (AST) of relational operators and tables, and wherein the storage engine is a software module configured to manage the tables and the plurality of tuples.

15. A computer implemented method of enhancing processing of a query to a relational database, the method comprising:
  performing, by processing circuitry of a server, the server being associated with a database comprising a plurality of tuples, each of the plurality of tuples comprising a plurality of attributes, the following steps:
    executing a query engine configured to receive a query, the query comprising at least one operator relating to at least one of the plurality of attributes;
    propagating the at least one operator to a storage engine;
    executing the storage engine, wherein the storage engine is configured to further propagate the at least one operator to a memory management module adjusted to:
      retrieve, from a secondary storage device storing at least one part of the database, a plurality of tuples
      write, into a cache, the plurality of tuples, and
      filter, using the at least one operator, the plurality of tuples written into the cache and thereby determine a set of complying tuples, each complying tuple complying with the at least one operator; and
    outputting each of the complying tuples received from the storage engine,
  wherein the adjusted memory management module is adjusted to filter, using the at least one operator, the plurality of tuples retrieved from the storage medium and thereby determine the set of complying tuples by implementing near data processing (NDP) to filter the tuples written into the cache at the point of data retrieval from the storage medium.

16. The computer implemented method of claim 15, wherein the query further includes at least one condition relating to the at least one operator, and
  wherein the at least one processing circuitry is configured to propagate the at least one operator and the at least one condition to the memory management module adjusted to process the plurality of tuples retrieved from a storage medium storing at least one part of the database and return each complying tuple of the plurality of tuples which complies with the at least one operator and the at least one condition.

17. The computer implemented method of claim 15, the method further comprising performing, by the processing circuitry, executing the query engine to apply at least one additional operator included in the query to at least one of the complying tuples of the set of complying tuples identify each complying tuple which complies with the at least one other operator.

18. The computer implemented method of claim 15, wherein the propagating the at least one operator to the storage engine is performed using an extended Application Programming Interface (API) configured to support transfer, of query semantics of a query language used by the query, from the query engine to the storage engine, and
  wherein the storage engine is configured to propagate the at least one operator to the adjusted memory management module using an extended operating system (OS) API configured to support transfer, of the query semantics of the query language, from the storage engine to the adjusted memory management module.

19. The computer implemented method of claim 18, wherein the cache is a page cache of the OS, and wherein the adjusted memory management module is an adjusted page cache management module configured to extend functionality of a legacy page cache management module configured to load pages of data stored in the secondary storage device to the page cache of the OS to further process at least one of the plurality of tuples stored in at least one page loaded to the page cache to identify at least one of the complying tuples.

20. A non-transitory computer readable storage medium comprising computer executable instructions that, when executed by a computer, cause the computer to perform the method according to claim 15.

* * * * *